(12) United States Patent
Ishikawa et al.

(10) Patent No.: US 11,094,097 B2
(45) Date of Patent: Aug. 17, 2021

(54) INFORMATION PROCESSING APPARATUS AND INFORMATION PROCESSING METHOD

(71) Applicant: SONY CORPORATION, Tokyo (JP)

(72) Inventors: Tsuyoshi Ishikawa, Kanagawa (JP); Kei Takahashi, Tokyo (JP); Daisuke Sasaki, Saitama (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/628,300

(22) PCT Filed: Jun. 29, 2018

(86) PCT No.: PCT/JP2018/024763
§ 371 (c)(1),
(2) Date: Jan. 3, 2020

(87) PCT Pub. No.: WO2019/013016
PCT Pub. Date: Jan. 17, 2019

(65) Prior Publication Data
US 2020/0219300 A1  Jul. 9, 2020

(30) Foreign Application Priority Data
Jul. 13, 2017  (JP) .............................. JP2017-137027

(51) Int. Cl.
*G06T 11/00* (2006.01)
*G06T 11/60* (2006.01)

(52) U.S. Cl.
CPC .......... *G06T 11/60* (2013.01); *G06T 2200/24* (2013.01); *G06T 2210/22* (2013.01)

(58) Field of Classification Search
None
See application file for complete search history.

(56) References Cited

U.S. PATENT DOCUMENTS

| 10,565,773 B1* | 2/2020 | Tytgat | H04N 13/25 |
| 2010/0287510 A1* | 11/2010 | Cragun | G09B 21/00 |
| | | | 715/848 |

(Continued)

FOREIGN PATENT DOCUMENTS

| JP | 2005-354644 A | 12/2005 |
| JP | 2013-198692 A | 10/2013 |

(Continued)

OTHER PUBLICATIONS

Yusuke, et al., "Metals Gear Solid 2—Sons of Liberty", First edition, Control guide Basic 2, Screen Explanation, Konami Computer Entertainment Japan, Inc., Mar. 5, 2002, 06 pages.

(Continued)

*Primary Examiner* — Martin Mushambo
(74) *Attorney, Agent, or Firm* — Chip Law Group

(57) ABSTRACT

The present technique relates to an information processing apparatus, an information processing method, and a program that can make an improvement in terms of communication regarding a plurality of users viewing the same content. Data of content is acquired, and a first visual field image corresponding to a visual field of a first user is cut out from a content image based on the data of the content. In addition, visual field information representing a visual field of a second user viewing the content image is acquired. Furthermore, in a display apparatus, the first visual field image is displayed, and the visual field of the second user is displayed based on the visual field information of the second user. The present technique can be applied to, for example, a case where a plurality users views content, such as a spherical image and a free viewpoint image.

19 Claims, 26 Drawing Sheets

(56) References Cited

U.S. PATENT DOCUMENTS

| | | | | |
|---|---|---|---|---|
| 2012/0056800 A1* | 3/2012 | Williams | .............. | G06F 3/0304 345/156 |
| 2014/0253671 A1* | 9/2014 | Bentley | ............... | H04L 12/1822 348/14.08 |
| 2014/0267589 A1* | 9/2014 | Matsubara | ......... | H04N 5/23238 348/36 |
| 2015/0331240 A1* | 11/2015 | Poulos | .................. | G06T 19/006 345/8 |
| 2016/0187972 A1* | 6/2016 | Biswas | .................. | G01C 21/36 345/156 |
| 2016/0358379 A1* | 12/2016 | Du | ..................... | G06K 9/00597 |
| 2017/0032495 A1* | 2/2017 | Kitazawa | ............. | H04N 13/117 |
| 2017/0150230 A1* | 5/2017 | Shimura | ............ | H04N 21/6125 |
| 2017/0236492 A1* | 8/2017 | Taki | ........................ | G09G 5/14 345/428 |

FOREIGN PATENT DOCUMENTS

| | | |
|---|---|---|
| JP | 2016-131662 A | 7/2016 |
| JP | 2017-034479 A | 2/2017 |

OTHER PUBLICATIONS

Yusuke, et al., "Metals Gear Solid 2—Sons of Liberty", Control guide Basic 2, Screen Explanation, Konami Computer Entertainment Japan, Inc., Mar. 5, 2002, 06 pages.

International Search Report and Written Opinion of PCT Application No. PCT/JP2018/024763, dated Jul. 31, 2018, 11 pages of ISRWO.

\* cited by examiner

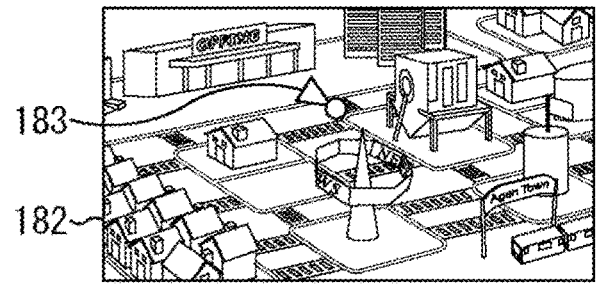
FIG. 15B
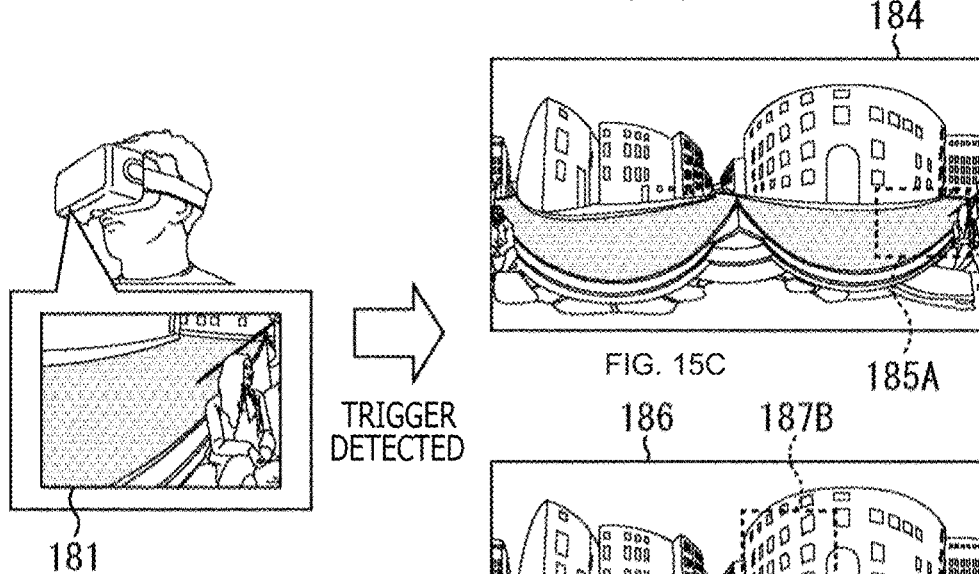
FIG. 15A
FIG. 15C
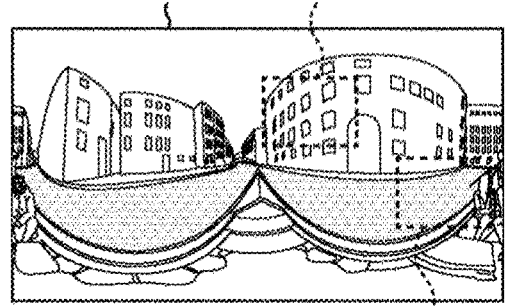
FIG. 15D
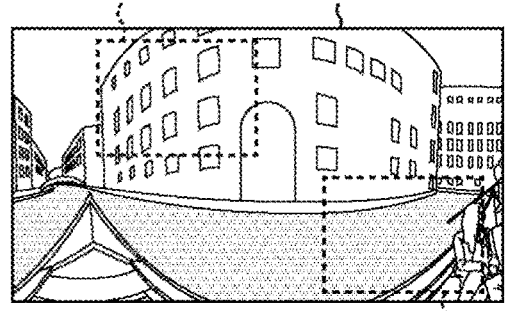
FIG. 15E

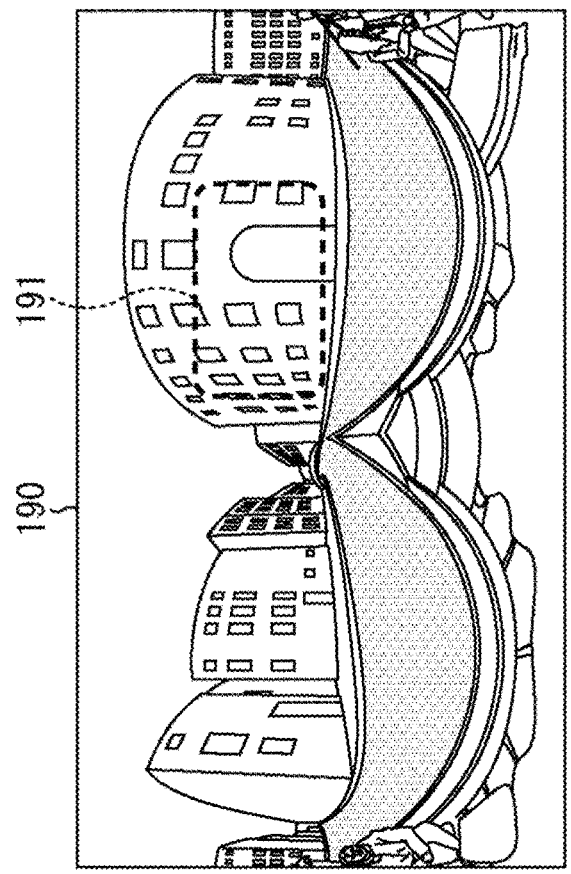
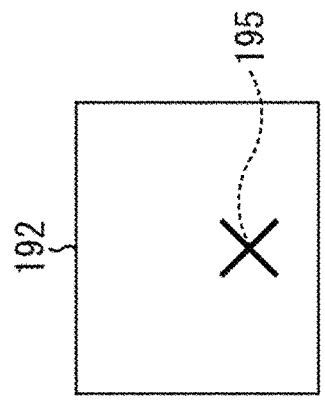
FIG. 18A
FIG. 18B

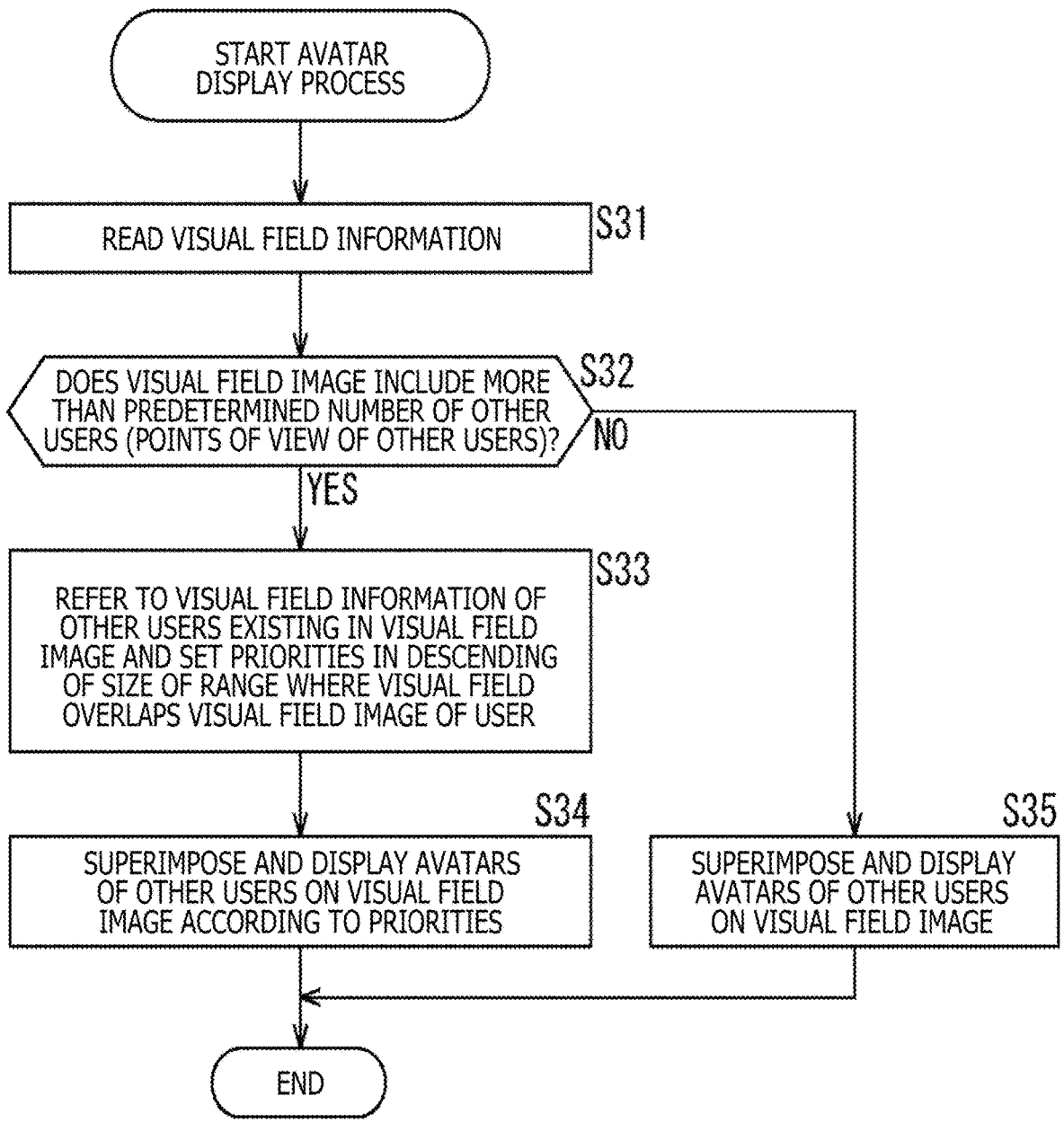

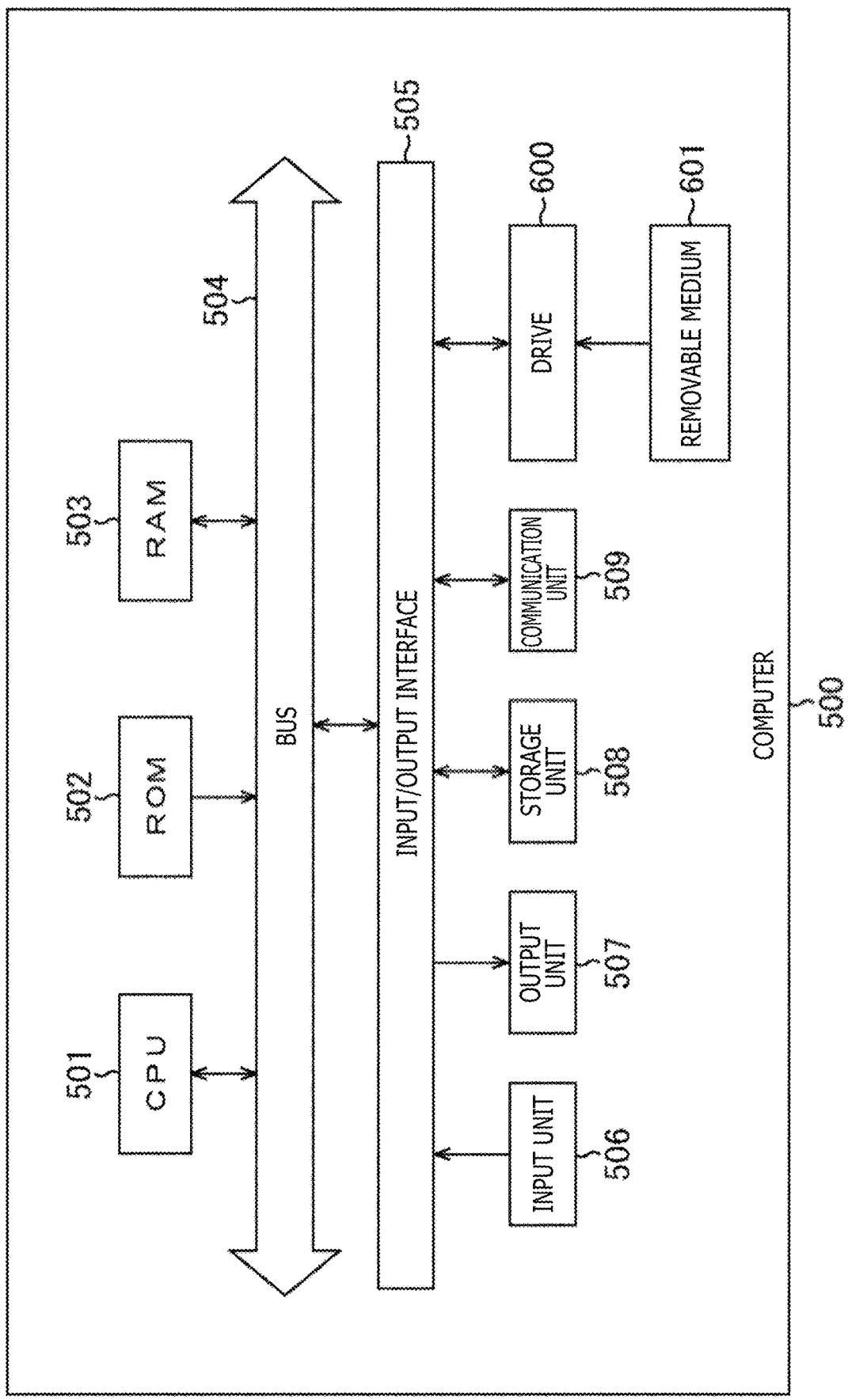

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/024763 filed on Jun. 29, 2018, which claims priority benefit of Japanese Patent Application No. JP 2017-137027 filed in the Japan Patent Office on Jul. 13, 2017. Each of the above-referenced applications is hereby incorporated herein by reference in its entirety.

TECHNICAL FIELD

The present technique relates to an information processing apparatus, an information processing method, and a program, and particularly, to an information processing apparatus, an information processing method, and a program that can improve communication regarding, for example, a plurality of users viewing the same content.

BACKGROUND ART

For example, it is assumed that a head mounted display (hereinafter, abbreviated as HMD) is used to view content, such as a spherical image including an image in a case of viewing the whole circumference from a point of view. In this case, part of a range of the entire image of the content is displayed on the HMD. A user wearing the HMD can move the head of the user to move the range displayed on the HMD to thereby move a range of an image (scene in the image) that can be viewed by the user, that is, a visual field of the user, in the spherical image (for example, see PTL 1).

For example, when the user wearing the HMD faces the right side, the range displayed on the HMD is moved to the right side of the currently displayed range in the spherical image. Therefore, the user can see the right side of the current visual field. In addition, when, for example, the user wearing the HMD faces above, the range displayed on the HMD is moved above the currently displayed range in the spherical image. Therefore, the user can see above the current visual field.

CITATION LIST

Patent Literature

[PTL 1]
JP 2005-354644A

SUMMARY

Technical Problem

Incidentally, in a case where a plurality of users wearing HMDs views the same content, each user can view an arbitrary range in the entire image of the content. However, the range viewed by a user (visual field of a user) and a range viewed by another user (visual field of another user) may not coincide. Therefore, there is room for improvement in terms of, for example, communication regarding the plurality of users viewing the same content.

The present technique has been made in view of such circumstances, and the present technique can improve communication regarding a plurality of uses viewing the same content.

Solution to Problem

An information processing apparatus or a program of the present technique is an information processing apparatus or a program for causing a computer to function as the information processing apparatus, the information processing apparatus including: a content acquisition unit configured to acquire data of content; an image cutting unit configured to cut out a first visual field image corresponding to a visual field of a first user from a content image based on the data of the content; a visual field information acquisition unit configured to acquire visual field information representing a visual field of a second user viewing the content image; and a display control unit configured to control a display apparatus to display the first visual field image and configured to control the display apparatus to display the visual field of the second user based on the visual field information of the second user.

An information processing method of the present technique is an information processing method including: acquiring data of content; cutting out a first visual field image corresponding to a visual field of a first user from a content image based on the data of the content; acquiring visual field information representing a visual field of a second user viewing the content image; and controlling a display apparatus to display the first visual field image and controlling the display apparatus to display the visual field of the second user based on the visual field information of the second user.

In the information processing apparatus, the information processing method, and the program of the present technique, the data of the content is acquired, and the first visual field image corresponding to the visual field of the first user is cut out from the content image based on the data of the content. In addition, the visual field information representing the visual field of the second user viewing the content image is acquired. Furthermore, the first visual field image is displayed on the display apparatus, and the visual field of the second user is displayed on the display apparatus based on the visual field information of the second user.

Advantageous Effect of Invention

According to an aspect of the present technique, communication by a plurality of users viewing the same content can be improved.

Note that the advantageous effect described here may not be limited, and the advantageous effect may be any of the advantageous effects described in the present disclosure.

BRIEF DESCRIPTION OF DRAWINGS

FIGS. 12A and 12B are diagrams illustrating an example of display of a tracking image that tracks the visual field of the other user.

FIGS. 15A, 15B, 15C, 15D, and 15E are diagrams illustrating an example of display of the wide area image switched from the visual field image.

FIGS. 18A and 18B are diagrams illustrating a relationship between a motion of a line of sight of the user and the movement of the visual field image.

DESCRIPTION OF EMBODIMENT

Hereinafter, the best mode (hereinafter, referred to as embodiment) for carrying out the present technique will be described in detail with reference to the drawings. Note that the embodiment will be described in the following order.

1. Configuration Example of Content Viewing System According to Present Technique
2. Presentation of Visual Field of Each User
3. Tracking Image That Tracks Visual Field of Another User
4. Highlighting User Speaking
5. Visual Field Information Presentation Process of User Apparatus 20
6. Switch of Visual Field Image and Wide Area Image
7. Movement of Visual Field Image
8. Selection of Avatar to Be Displayed
9. A Series of Processes Executed by Software Note that in the present specification, it can be assumed that a system denotes a set of a plurality of constituent elements (apparatuses, modules (parts), and the like), and not all of the constituent elements have to be in the same housing. Therefore, both a plurality of apparatuses housed in separate housings and connected through a network and one apparatus including a plurality of modules contained in one housing can be assumed as systems in the present specification.

<1. Configuration Example of Content Viewing System According to Present Technique>

Figure 1:
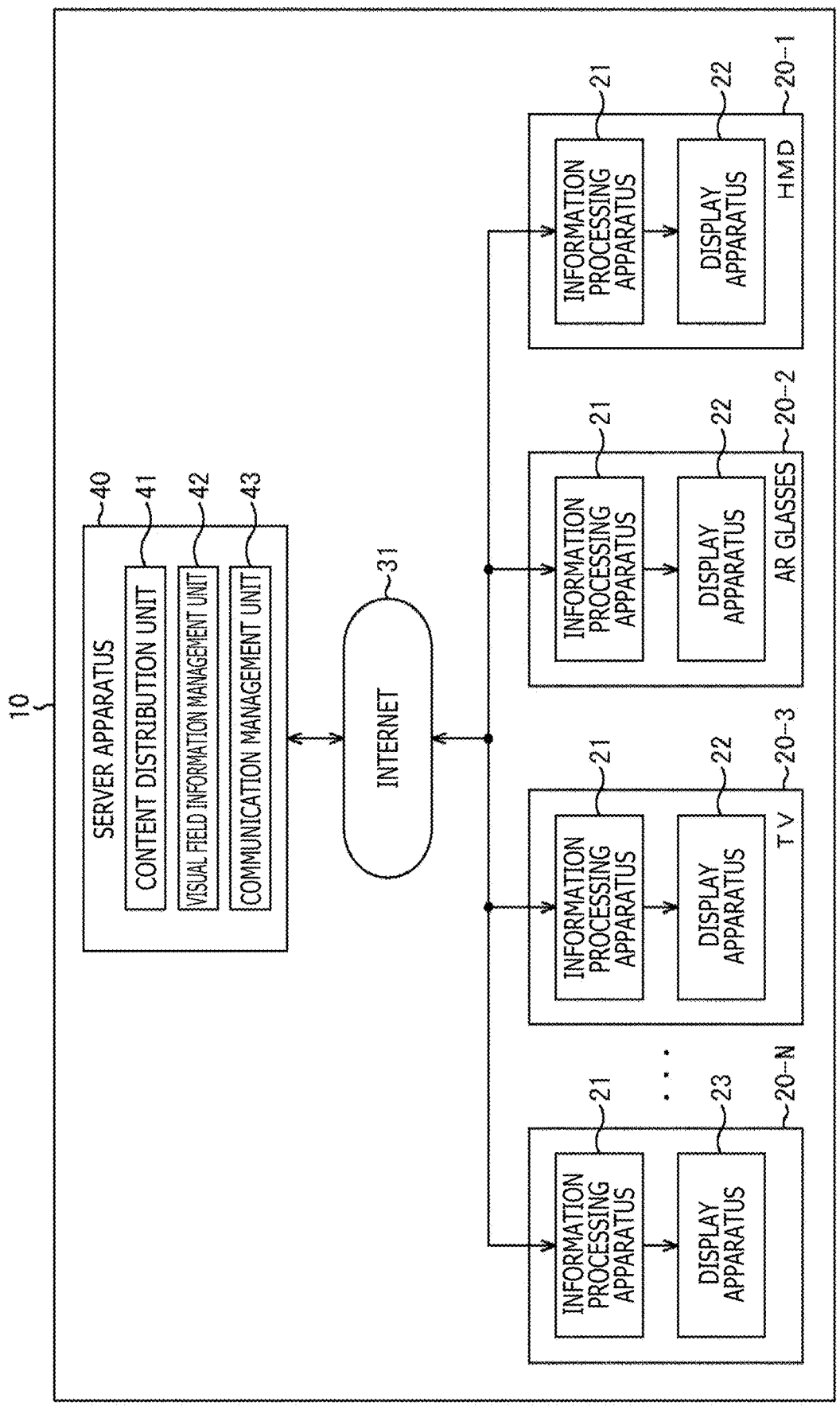
FIG. 1 is a block diagram illustrating a configuration example of a content viewing system according to the present technique.

FIG. 1 is a block diagram illustrating a configuration example of a content viewing system according to the present technique.

A content viewing system 10 enables to figure out visual fields of other users in a case where a plurality of users views the same content. Note that the content includes an image. Obviously, there can be voice corresponding to the image. However, only the image of the content will be mentioned below, and the voice of the content will be not be mentioned.

The timing of the plurality of users viewing the same content does not have to be the same time. For example, when a user (referred to as user A) views the content, visual field information representing the visual field of the user A may be saved. At later timing, the visual field of the user A may be presented to another user (referred to as user B) viewing the same content based on the saved visual field information of the user A.

The content provided by the content viewing system 10 can be a spherical image including an image in a case of viewing the whole circumference from a point of view or a free viewpoint image including an image in a case of viewing the whole circumference while the point of view is moved.

The spherical image and the free viewpoint image can be any of an image obtained by photographing a real space (photographed image), an image of the real space photographed in real time (image being photographed), an image obtained by using computer graphics to generate a VR (virtual reality) space of a game or the like, an image including a virtual object superimposed on the real space, and the like.

The content viewing system 10 includes user apparatuses 20-1 to 20-N (N is a natural number) used by users and a server apparatus 40. Hereinafter, the user apparatuses 20-1 to 20-N will be simply referred to as a user apparatus 20 in a case where the user apparatuses 20-1 to 20-N do not have to be individually distinguished.

The user apparatus 20 includes an information processing apparatus 21 and a display apparatus 22. The information processing apparatus 21 mainly executes a process of cutting out part of an image of the content to generate a visual field image to be displayed on the display apparatus 22. The display apparatus 22 mainly displays the visual field image. In addition, the display apparatus 22 displays visual fields of other users using other user apparatuses 20 to present the visual fields of the other users to the user of the user apparatus 20.

The user of the user apparatus 20 views the visual field image displayed on the display apparatus 22 in the image of the content. Therefore, the range of the scene in the visual field image is the visual field of the user viewing the visual field image. The angle of view of the visual field image, that is, the visual field size of the visual field of the user viewing the visual field image (visual field size (field of view) of the visual field provided by the display apparatus 22 to the user viewing the visual field image), varies depending on a display device as the display apparatus 22 or display software that displays the image. For example, there are a display device in which the angle of view of the visual field image is 90 degrees, a display device in which the angle of view of the visual field image is 210 degrees, and the like.

An example of the display apparatus 22 includes a display apparatus worn and used on the head of the user, such as AR (augmented reality) glasses and other HMDs. However, the display apparatus 22 may be a planar display device, such as a television receiver, or a display device that projects an image, such as a projector.

Note that the information processing apparatus 21 and the display apparatus 22 included in the user apparatus 20 may be integrated or may be placed in different housings and separately arranged. The connection between the information processing apparatus 21 and the display apparatus 22 may be wired connection or may be wireless connection.

The server apparatus 40 is connected to the user apparatus 20 through the Internet 31. The server apparatus 40 includes a content distribution unit 41, a visual field information management unit 42, and a communication management unit 43.

The content distribution unit 41 distributes data of content through the Internet 31 according to requests from the user apparatuses 20. The data of the content may be distributed to the user apparatuses 20 at the same timing or at different timing.

The visual field information management unit 42 acquires, from each user apparatus 20, visual field information representing the visual field of the user at the time that the content is viewed in each user apparatus 20 and manages the visual field information.

The visual field information includes at least one of content identification information, elapsed time information, point-of-view information, visual field center information, or visual field size information.

The content identification information is information for identifying the content. The elapsed time information exists in a case where the image of the content changes with time, and the elapsed time information is information representing the elapsed time from the top of the content (temporal position where the content is reproduced). The point-of-view information is information representing the position of the point of view in a content space that is a space (of the scene) in the free viewpoint image in the case the content is a free viewpoint image.

The visual field center information is information representing a visual field center (coordinates of the visual field center) that is the center of the visual field image (range as the visual field of the user) cut out from the image of the content in the user apparatus 20, that is, the content image based on the data of the content. The visual field size information is information representing a visual field size that is the size of the visual field image cut out from the content image in the user apparatus 20, that is, the size of the range as the visual field of the user viewing the visual field image (size of the visual field provided by the display apparatus 22 to the user viewing the visual field image). Note that the user can arbitrarily set the visual field size within a range permitted by the display apparatus 22. In addition, the visual field center can be considered as the center of the visual field of the user viewing the visual field image, and the visual field size can be considered as the size of the visual field of the user viewing the visual field image.

The content identification information can be referenced to specify the content viewed by the user. The elapsed time information can be referenced to specify the temporal position (timing) (seek position) of the content viewed by the user in the case where the content specified by the content identification information is content that changes with time.

The visual field center information, as well as the visual field size information and the point-of-view information if necessary, can be referenced to specify the visual field of the user viewing the content specified by the content identification information, that is, the visual field image (range of the visual field image) viewed by the user in the content image. Note that to roughly figure out the visual field (field of view) of the user, the visual field information not including the visual field size information can be transmitted and received. In addition, the visual field size of each user can be assumed as the same fixed value, and the visual field of each user can be specified from the visual field center.

The communication management unit 43 manages communication, such as exchange of messages using voice or characters, between the users viewing the same content.

Note that the function of the server apparatus 40 may be provided to at least one of the user apparatuses 20, and a plurality of user apparatuses 20 including the user apparatus 20 provided with the function of the server apparatus 40 may be connected to each other through an intranet or the like.

Figure 2:
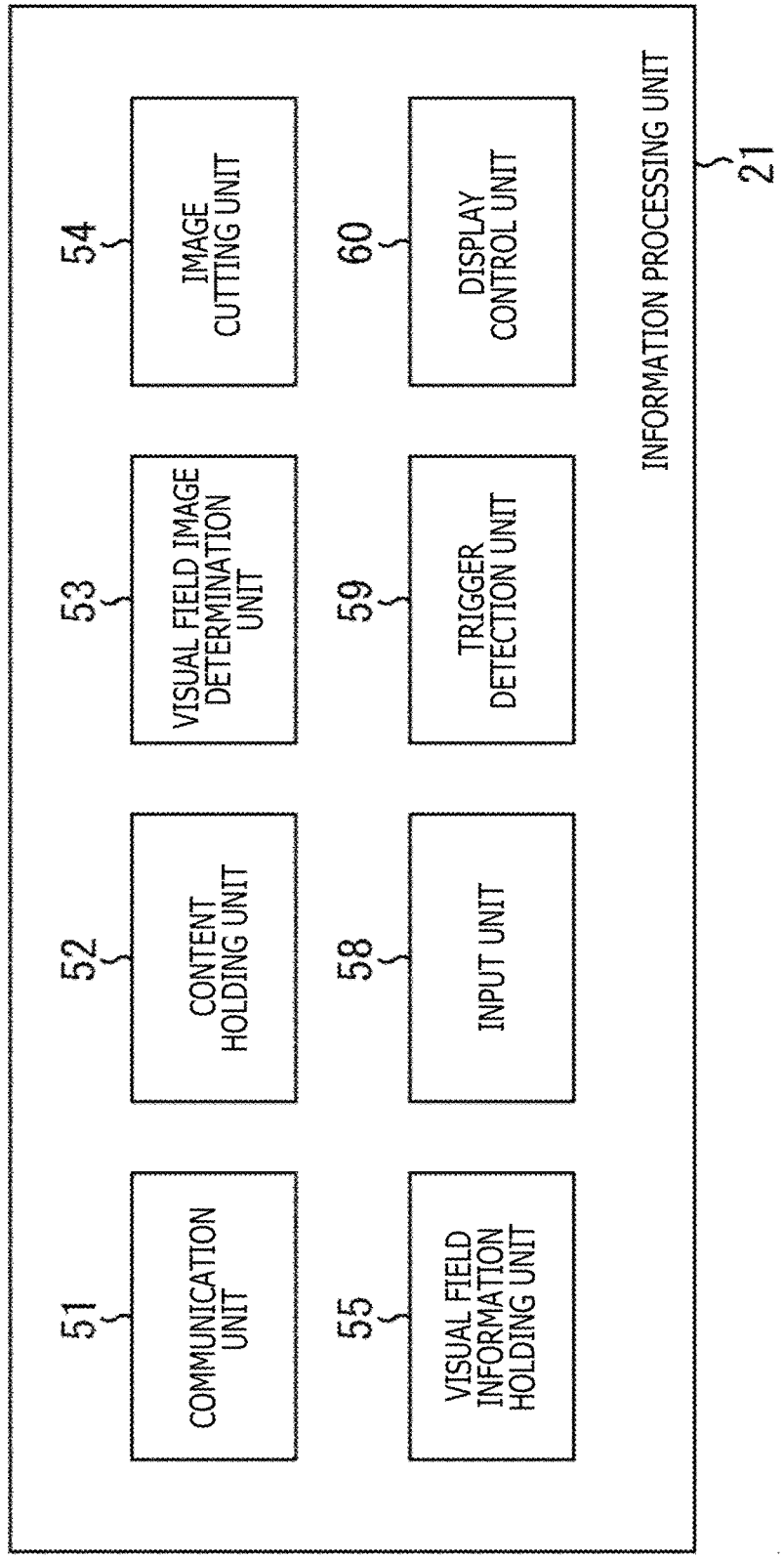
FIG. 2 is a block diagram illustrating a configuration example of an information processing apparatus.

FIG. 2 is a block diagram illustrating a configuration example of the information processing apparatus 21 included in the user apparatus 20.

The information processing apparatus 21 includes a communication unit 51, a content holding unit 52, a visual field image determination unit 53, an image cutting unit 54, a visual field information holding unit 55, an input unit 58, a trigger detection unit 59, and a display control unit 60.

The communication unit 51 connects to the server apparatus 40 through the Internet 31 and functions as a content acquisition unit that acquires the data of the content. Furthermore, the communication unit 51 acquires image data and the like of user images corresponding to the users (user images representing the users), such as icons and avatars of the users. The data and the like of the content acquired by the communication unit 51 from the server apparatus 40 are recorded in the content holding unit 52. In addition, the communication unit 51 notifies the server apparatus 40 of the visual field information, which is sequentially generated by the visual field information holding unit 55, of the user (first user) using the user apparatus 20. Furthermore, the communication unit 51 functions as a visual field information acquisition unit that acquires, from the server apparatus 40, the visual field information of another user (second user) using another user apparatus 20 to view the content. The communication unit 51 outputs the visual field information of the other user acquired from the server apparatus 40 to the visual field information holding unit 55.

The content holding unit 52 holds the data of the content acquired from the server apparatus 40. In addition, the content holding unit 52 holds the image data and the like of the user image, such as an icon and an avatar for representing each user, to be superimposed and displayed on the image (visual field image) cut out from the content image based on the data of the content.

Figure 3:
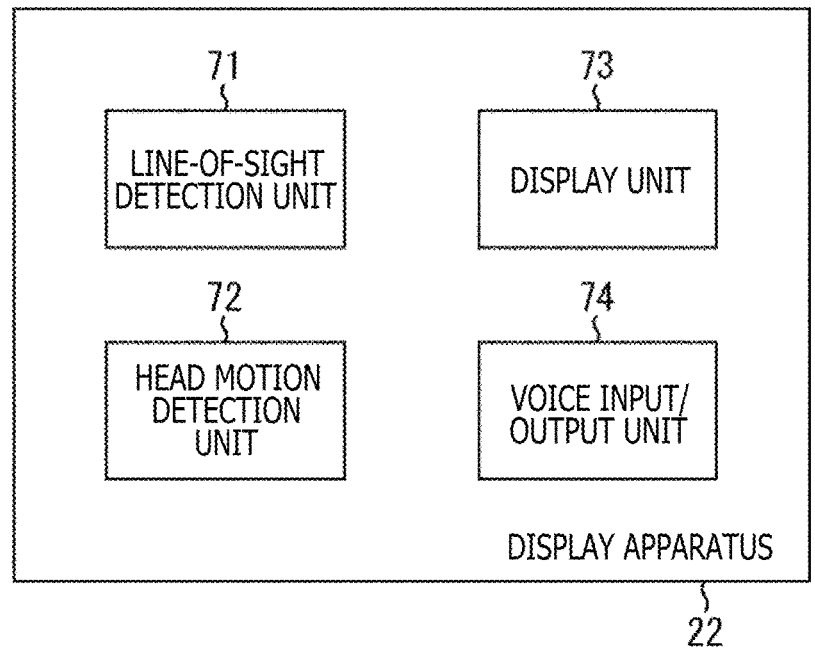
FIG. 3 is a block diagram illustrating a configuration example of a display apparatus.

The visual field image determination unit 53 determines the visual field center based on at least one of an amount of movement of the line of sight notified from a line-of-sight detection unit 71 (FIG. 3) of the display apparatus 22 or an amount of movement of the head notified from a head motion detection unit 72 (FIG. 3). Furthermore, the visual field image determination unit 53 determines the visual field image (range of the visual field image) of the user to be cut out from the content image based on the visual field center and the visual field size (visual field size of the visual field provided (limited) by the display apparatus 22 to the user viewing the visual field image). For example, in the case where the display apparatus 22 is an HMD, the visual field image determination unit 53 determines the visual field center based on at least one of the movement of the line of sight of the user or the movement of the head of the user associated with the HMD as the display apparatus 22 and determines the visual field image of the user based on the visual field center and the visual field size.

In addition, the visual field image determination unit 53 moves the visual field image of the user based on the line of sight of the user in response to approach of the line of sight of the user to an edge of the visual field image of the user.

Note that the visual field image determination unit 53 can make an angle of rotation, which is the amount of movement of the visual field image of the user, larger than an angle of rotation of the head of the user based on the angle of rotation of the line of sight of the user and the angle of rotation of the head.

In addition, the visual field image determination unit 53 can determine an initial position of the visual field image corresponding to the timing that the user has substantially started to view the content (timing that the user has started to use the user apparatus 20), that is, an initial position of the visual field center of the visual field image, based on the visual field information of other users. For example, the visual field image determination unit 53 can specify, based on the visual field information of the other users, a region in the content image where the visual fields of equal to or more than a predetermined number of other users are gathered and can determine a position in the region as the initial position of the visual field center. Furthermore, the visual field image determination unit 53 can determine the visual field image to be cut out from the content image, that is, determine, as the visual field image, the image of the range with the center at the initial position of the visual field center in the content image, based on the initial position of the visual field center. In this case, the user can easily communicate with the other users right after the user starts to view the content.

The image cutting unit 54 cuts out (to thereby generate) the visual field image corresponding to the visual field of the user, that is, the visual field image determined by the visual field image determination unit 53, from the content image based on the data of the content. In addition, the image cutting unit 54 can acquire the visual field information of another user from the visual field information holding unit 55 and cut out, as the visual field image, an image in the visual field size of the user (visual field size indicated in the visual field size information included in the visual field information of the user) or in the visual field size of the other user from the content image according to the visual field information of the other user. The visual field image can be displayed on the display apparatus 22 as, for example, a tracking image that tracks the visual field of the other user. According to the tracking image, the user can set the visual field of the other user as the visual field of the user and view an image similar to the visual field image viewed by the other user.

The visual field information holding unit 55 sequentially updates and holds the visual field information in the user apparatus 20 and outputs the visual field information to the communication unit 51 to cause the communication unit 51 to notify the server apparatus 40 of the visual field information. In addition, the visual field information holding unit 55 holds the visual field information of other users acquired by the communication unit 51 from the server apparatus 40.

The input unit 58 includes an operation device, such as a remote control, a voice input device, such as a microphone, and an imaging device, such as a camera. The input unit 58 inputs a key operation of the user using the operation device, inputs a speech of the user using the voice input device, or inputs an image obtained by taking a picture of the user using the imaging device.

The trigger detection unit 59 detects a key operation, a voice command, a gesture, or the like as a trigger of predetermined action from an operation, a speech, an image, or the like of the user input by the input unit 58.

The display control unit 60 controls the display to cause the display apparatus 22 to display the visual field image and the user image representing the user, such as an icon and an avatar corresponding to each user. In addition, the display control unit 60 controls the display to cause the display apparatus 22 to display the visual fields (information representing the visual fields) of the users that need to be displayed, based on the visual field information of each user.

For example, the display control unit 60 causes the display apparatus 22 to display a visual field position instruction image indicating the position of the visual field of another user based on the visual field information of the other user. The visual field position instruction image includes a wide area image 112 (FIG. 5) including the visual field image (first visual field image) of the user of the user apparatus 20 and the visual field image (second visual field image) corresponding to the visual field of the other user. Furthermore, the visual field position instruction image includes a symbol image that indicates the position of the visual field of the other user and that is superimposed on the visual field image of the user of the user apparatus 20. Examples of the symbol image include a visual field direction instruction mark, a visual field direction instruction line, and the like described later.

Note that the display control unit 60 can control the display apparatus 22 to switch the visual field image of the user of the user apparatus 20 and the wide area image in response to a predetermined trigger. The predetermined trigger includes at least one of the key operation, the voice command, the motion of the head, or the gesture operation of the user of the user apparatus 20.

In addition, the display control unit 60 superimposes the user image, such as an avatar, of another user on the visual field image of the user and causes the display apparatus 22 to display the image. In a case where there are a plurality of other users, the display control unit 60 can superimpose at least one of a plurality of user images corresponding to the plurality of other users on the visual field image of the user and cause the display apparatus 22 to display the image.

For example, the display control unit 60 can set priorities of the other users for which the user images, such as avatars, are to be superimposed and displayed on the visual field image or the like in the display apparatus 22 and can cause the display apparatus 22 to display part or all of the user images of the plurality of other users according to the priorities.

For example, the display control unit 60 can control (determine the priorities) whether or not to superimpose each of the plurality of user images of the plurality of other users on the visual field image of the user according to the positional relationship between the visual field image of the user and each of the visual fields of the plurality of other users.

In addition, for example, the display control unit 60 can preferentially superimpose, on the visual field image of the user, the user image of another user with the visual field relatively close to the visual field image of the user (visual field provided by the visual field image) among the plurality of other users and can cause the display apparatus 22 to display the image.

Furthermore, for example, the display control unit 60 can preferentially superimpose, on the visual field image of the user, part of the plurality of user images of the plurality of other users according to a history of communication between the user and the plurality of other users and can cause the display apparatus 22 to display the image.

FIG. 3 is a block diagram illustrating a configuration example of the display apparatus 22 included in the user apparatus 20. Particularly, FIG. 3 illustrates a configuration example suitable for a case in which the display apparatus 22 is an HMD mounted on the head of the user.

The display apparatus 22 includes the line-of-sight detection unit 71, the head motion detection unit 72, a display unit 73, and a voice input/output unit 74.

The line-of-sight detection unit 71 detects the line of sight of the user. For example, the corneal reflex or other arbitrary methods and techniques can be used to detect the line of sight. Furthermore, the line-of-sight detection unit 71 detects, as an amount of movement of the line of sight, an angle (line-of-sight movement angle) from the middle of the visual field image (visual field middle) displayed on the display unit 73 to the line of sight of the user and transmits the line-of-sight movement angle to the visual field image determination unit 53 of the information processing apparatus 21.

The head motion detection unit 72 detects, as an amount of movement of the head, a head rotation angle of the user wearing the HMD as the display apparatus 22 and transmits the head rotation angle to the visual field image determination unit 53 of the information processing apparatus 21. The head rotation angle of the user wearing the HMD as the display apparatus 22 is also an angle of rotation of the HMD.

The display unit 73 displays the visual field image and the like based on an image signal of the visual field image and the like supplied from the display control unit 60.

The voice input/output unit 74 includes, for example, a microphone and a speaker and is configured to output voice of the content (content voice based on the data of the content) and input speech of the user. The input speech of the user is used for, for example, communication between the users viewing the same content. That is, the input speech of the user is transmitted to the other user apparatuses 20 and output from the speakers of the voice input/output units 74 of the other user apparatuses 20.

The HMD as the display apparatus 22 includes the line-of-sight detection unit 71 and the head motion detection unit 72 as described above, and the movement of the line of sight of the user and the movement of the head are detected in the HMD (in association with the HMD).

<2. Presentation of Visual Field of Each User>

Figure 4:
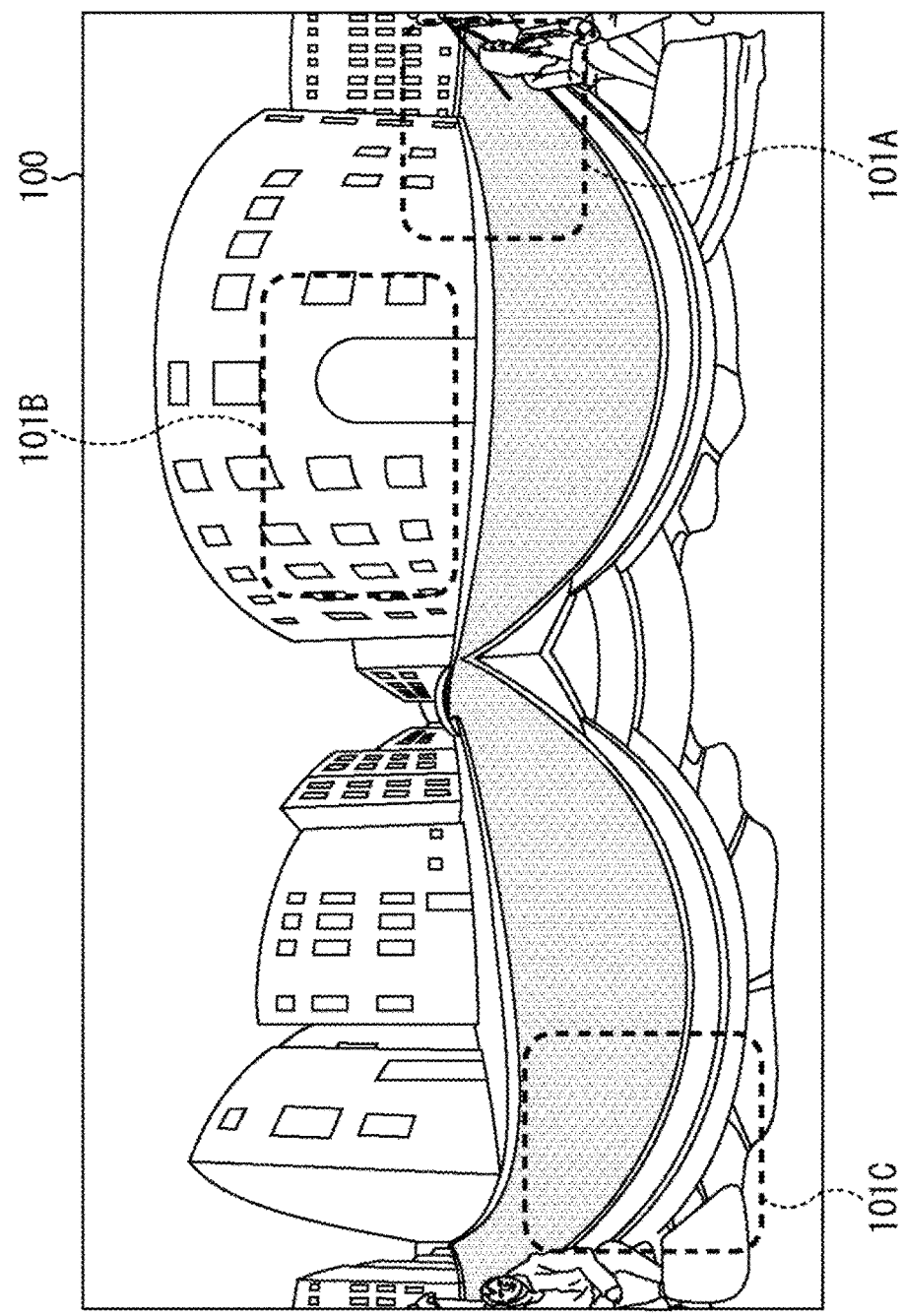
FIG. 4 is a diagram illustrating an example of an entire image.

FIG. 4 is a diagram illustrating an example of an entire image including an entire content image developed on a plane.

An entire image 100 is an image obtained by using an equirectangular projection method to develop, on the plane, the entire content image that is a spherical image.

Note that the projection for developing, on the plane, the entire content image that is a spherical image may be a projection other than the equirectangular projection method. For example, a Mercator projection method can be used instead of the equirectangular projection method. Hereinafter, the image developed on the plane by using the equirectangular projection method will be referred to as an equirectangular projection. Similarly, an image developed on the plane by using the Mercator projection method will be referred to as a Mercator projection.

In this case, it is assumed that the content is shared (viewed) by three users A to C. However, the timing of the users A to C viewing the content may not be the same time.

The display apparatus 22 used by the user A displays a visual field image generated by cutting out, from the content image, a visual field range 101A according to the visual field center information and the visual field size information of the visual field information of the user A (range in the visual field size indicated in the visual field size information, with the center at the visual field center indicated in the visual field center information). Similarly, the display apparatus 22 used by the user B displays a visual field image generated by cutting out, from the content image, a visual field range 101B according to the visual field center information and the visual field size information of the visual field information of the user B. The display apparatus 22 used by the user C displays a visual field image generated by cutting out, from the content image, a visual field range 10CB according to the visual field center information and the visual field size information of the visual field information of the user C.

The visual field range 101A represents the visual field (range of the visual field) of the user A. Similarly, the visual field range 101B represents the visual field of the user B, and the visual field range 101C represents the visual field of the user C.

<Method Using Wide Area Image>

Figure 5:
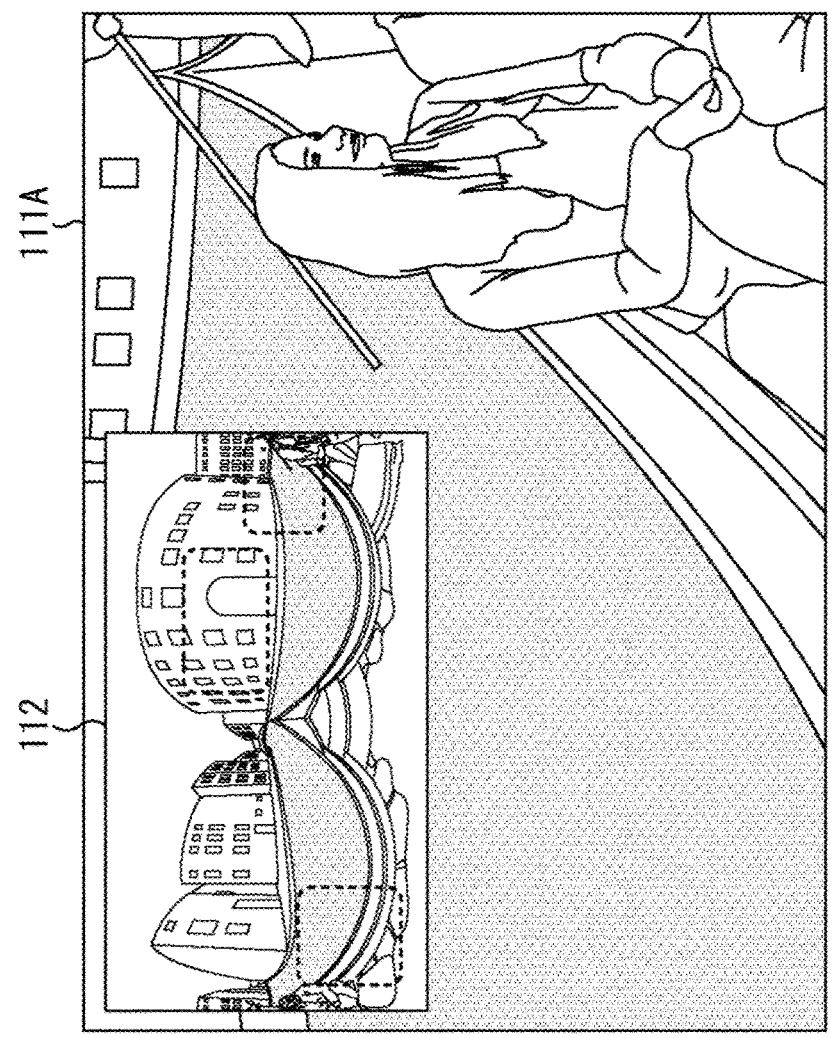
FIG. 5 is a diagram illustrating an example of display of a visual field image cut out from a content image.

FIG. 5 is a diagram illustrating an example of display of a visual field image 111A that is displayed on the display apparatus 22 used by the user A and that is generated by cutting out the visual field range 101A from the content image.

However, in the case of FIG. 5, the wide area image 112 is superimposed and displayed at a predetermined position in the visual field image 111A (upper left in the case of FIG. 5) according to a predetermined operation of the user A.

The wide area image 112 is a type of visual field position instruction image indicating the positions of the visual fields of the other users (in this case, users B and C) sharing (viewing) the same content in order to present the visual fields of the other users to the user (in this case, user A).

The wide area image 112 is generated by using all or part of the entire image 100. That is, the wide area image 112 is generated by cutting out, from the entire image 100, a range including the visual field image of the user (first visual field image) and the visual field images of the other users (second visual field images). Therefore, in a case where the visual fields of a plurality of users sharing the content are dispersed, the wide area image 112 is generated based on an image obtained by cutting out a large range of the entire image 100 or based on all of the entire image 100. In a case where the visual fields of a plurality of users sharing the content are concentrated, the wide area image 112 is generated based on an image obtained by cutting out a small range from the entire image 100. Note that the wide area image 112 can always be generated based on all of the entire image 100.

Figure 6:
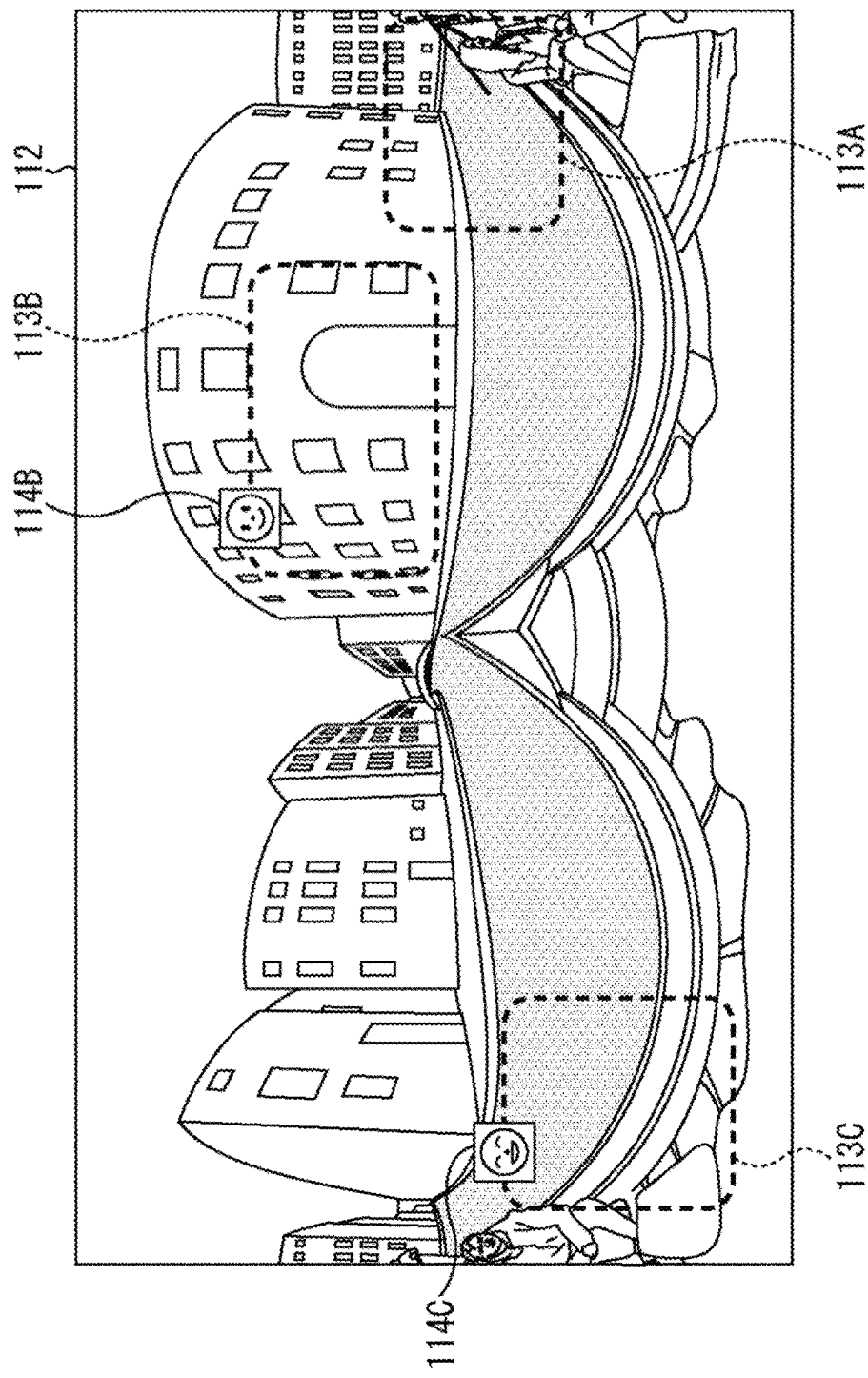
FIG. 6 is an enlarged view of a wide area image superimposed on the visual field image.

FIG. 6 is an enlarged view of the wide area image 112 superimposed on the visual field image 111A (FIG. 5) displayed on the display apparatus 22 used by the user A.

The wide area image 112 displayed on the display apparatus 22 of the user A (display apparatus 22 used by the user A) includes the visual field image of the user A and the visual field images of the users B and C as other users sharing the same content with the user A. Therefore, the wide area image 112 includes the visual field range (of the visual field)

of the user A and the visual field ranges of the users B and C. Note that although the wide area image 112 is an equirectangular projection in FIG. 6, the wide area image 112 may be any of a Mercator projection, an aerial view, a bird's eye view, and a plan view such as a two-dimensional map.

In FIG. 6, visual field range display 113A representing the visual field range of the user A, visual field range display 113B representing the visual field range of the user B, an icon 114B as a user image of the user B, visual field range display 113C representing the visual field range of the user C, and an icon 114C as a user image of the user C are superimposed and displayed on the wide area image 112.

According to the visual field range display 113B and the icon 114B, the visual field range 101B (FIG. 4) of the user B is presented to the user A. Similarly, according to the visual field range display 113C and the icon 114C, the visual field range 101C (FIG. 4) of the user C is presented to the user A.

Therefore, the wide area image 112 is superimposed and displayed on the visual field image 111A (FIG. 5) displayed on the display apparatus 22 used by the user A, and the user A can figure out the visual fields of the other users (in this case, users B and C) sharing the content.

This can improve the communication regarding a plurality of users viewing the same content. That is, in a case where, for example, the users perform communication, such as exchange of messages using voice or characters, regarding the things viewed by the users, a situation such as miscommunication can be suppressed, and smooth communication between the users can be assisted.

Note that instead of superimposing and displaying the wide area image 112 on the visual field image 111A (FIG. 5), the wide area image 112 may be displayed on a display device other than the display apparatus 22, such as, for example, a television receiver.

Next, other methods of presenting the visual field ranges of the other users sharing the content to the user will be described.

<Method Using Visual Field Direction Instruction Marks>

Figure 7:
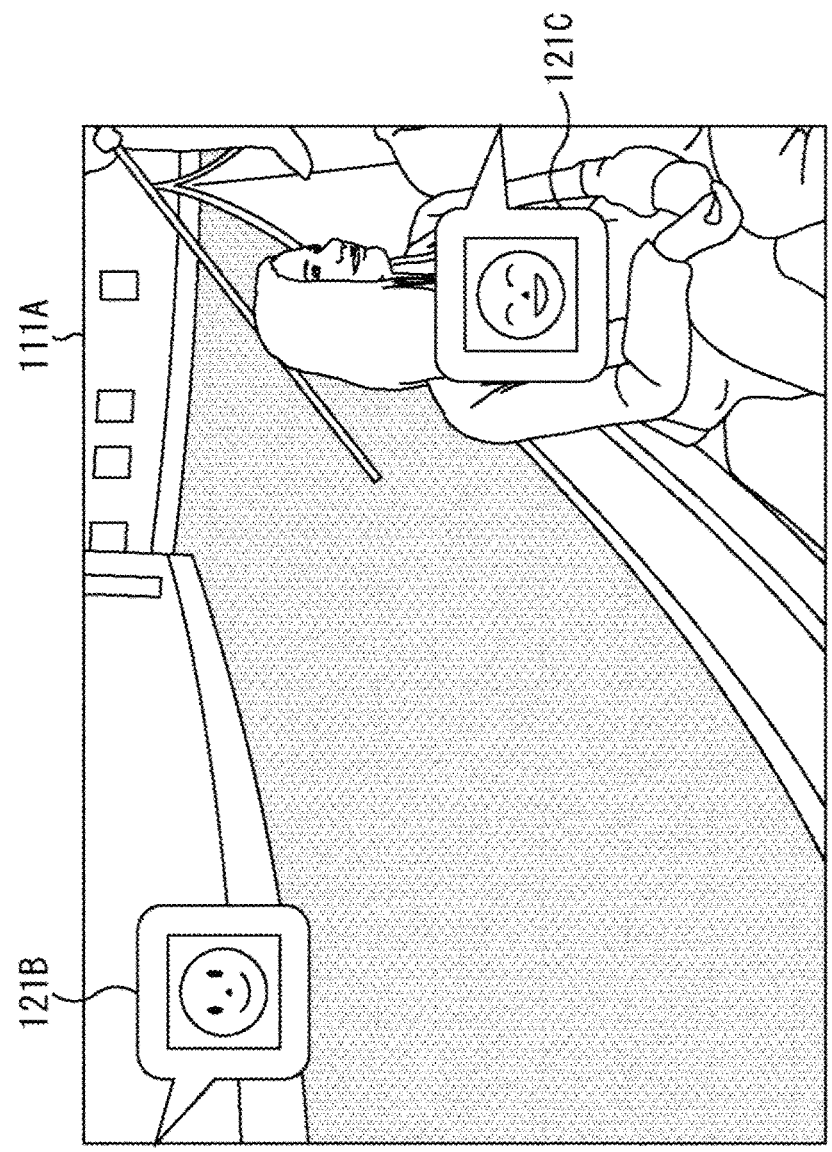
FIG. 7 is a diagram illustrating an example of display in a case where visual field direction instruction marks are superimposed and displayed on the visual field image.

FIG. 7 is a diagram illustrating an example of display in a case where visual field direction instruction marks 121, which represent the directions of the locations of the visual fields of other users sharing the content, are superimposed and displayed as symbol images, which indicate the positions of the visual fields of the other users, on the visual field image 111A, which is displayed on the display apparatus 22 used by the user.

In the example of display of FIG. 7, a visual field direction instruction mark 121B corresponding to the user B and a visual field direction instruction mark 121C corresponding to the user C are superimposed and displayed on the visual field image 111A corresponding to the user A (visual field image of user A).

The visual field direction instruction mark 121B is obtained by surrounding the icon 114B (FIG. 6) corresponding to the user B by a graphic including an acute projection, and the acute projection indicates the direction of the visual field of the user B.

Similarly, the visual field direction instruction mark 121C is obtained by surrounding the icon 114C (FIG. 6) corresponding to the user C by a graphic including an acute projection (graphic illustrating a so-called speech bubble), and the acute projection indicates the direction of the visual field of the user C.

The visual field direction instruction marks 121B and 121C superimposed on the visual field image 111A displayed on the display apparatus 22 used by the user A allow the user A to figure out the directions of the locations of the visual fields of the other users sharing the content (in this case, users B and C). The user A can, for example, rotate the head in the upper left direction indicated by the acute projection of the visual field direction instruction mark 121B to move the visual field of the user (user A) to the visual field of the user B.

Similarly, the user A can, for example, rotate the head in the right direction indicated by the acute projection of the visual field direction instruction mark 121C to move the visual field of the user (user A) to the visual field of the user C.

Figure 8:
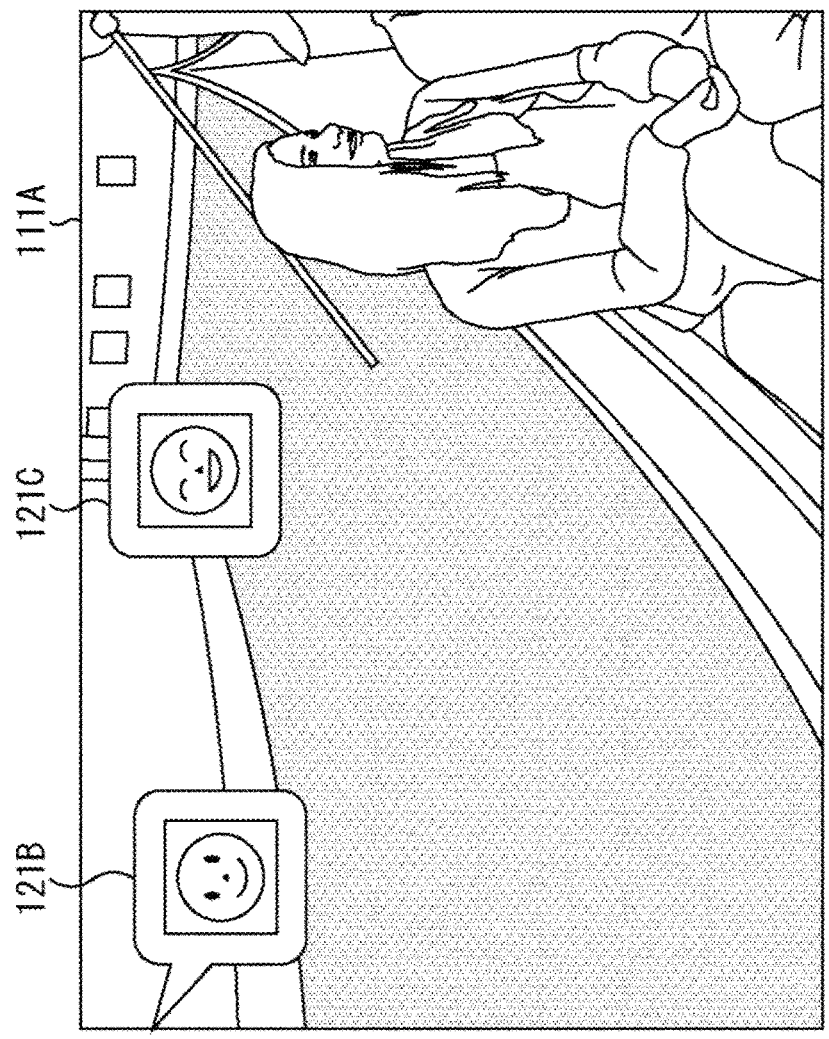
FIG. 8 is a diagram illustrating an example of display of the visual field image in a case where a visual field of a user is narrower than a visual field of another user.

FIG. 8 is a diagram illustrating an example of display of the visual field image in a case where the visual field of the user is narrower than the visual field of another user.

As illustrated in FIG. 7 described above, when the user A viewing the visual field image 111A including the superimposed visual field direction instruction mark 121C rotates the head in the right direction indicated by the acute projection of the visual field direction instruction mark 121C, the visual field image 111A (range cut out as the visual field image 111A) displayed on the display apparatus 22 moves to the right side of the content image. As a result, the visual field of the user (user A) gradually approaches the visual field of the user C. Accordingly, the acute projection of the visual field direction instruction mark 121C is gradually reduced. Furthermore, when the visual field of the user (user A) is included in the visual field of the user C wider than the visual field of the user (user A) (when the visual field image (displayed on the display apparatus 22) of the user A is included in the visual field image of the user C), the acute projection of the visual field direction instruction mark 121C disappears as illustrated in FIG. 8.

Therefore, the size of the projection of the visual field direction instruction mark 121C superimposed on the visual field image 111A displayed on the display apparatus 22 of the user A allows the user A to figure out the proximity and the degree of coincidence of the visual field of the user (user A) and the visual field of the other user (in this case, user C).

Furthermore, when the projection of the visual field direction instruction mark 121C disappears, it can be determined that the user (user A) and the other user (in this case, user C) are viewing the same thing. Therefore, the user A and the user C can perform communication, such as exchange of messages, in this state, and the situation such as miscommunication can be suppressed.

Figure 9:
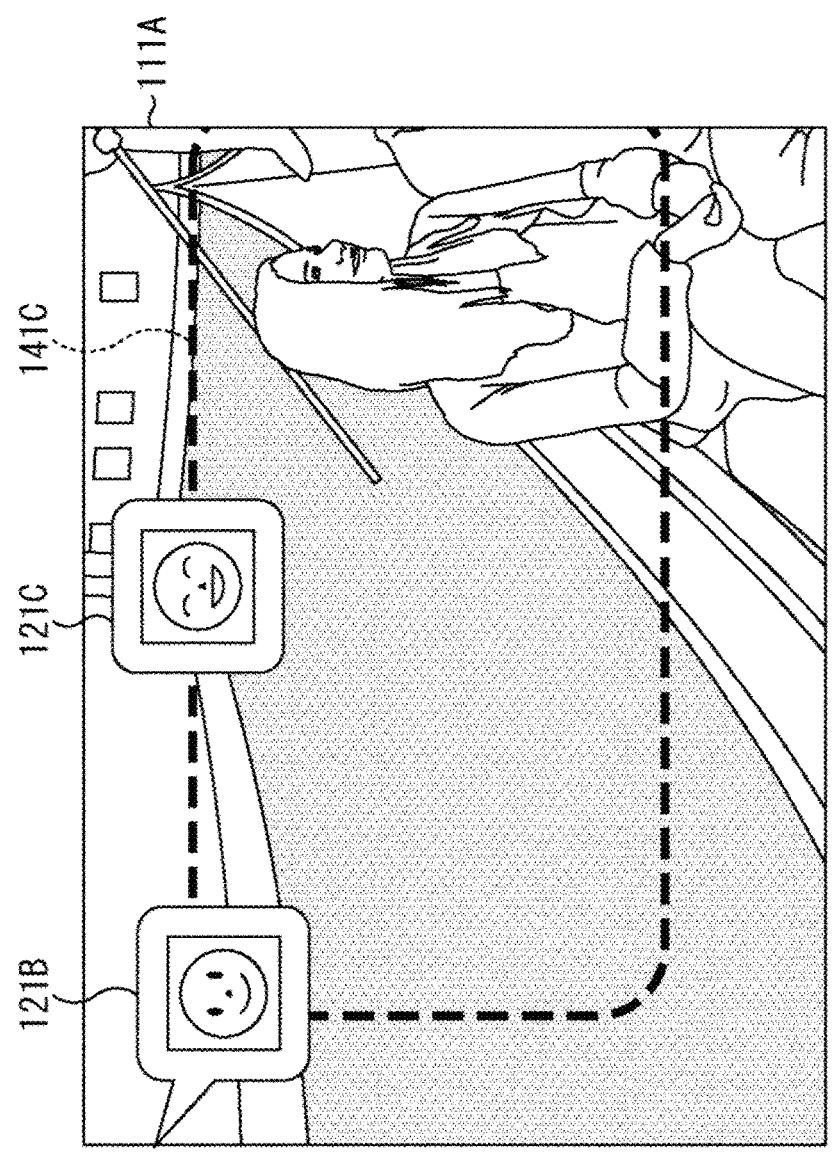
FIG. 9 is a diagram illustrating an example of display of the visual field image in a case where the visual field of the user is wider than the visual field of the other user.

FIG. 9 is a diagram illustrating an example of display of the visual field image in a case where the visual field of the user is wider than the visual field of another user.

As in FIG. 7 described above, when the user A viewing the visual field image 111A including the superimposed visual field direction instruction mark 121C rotates the head in the right direction indicated by the acute projection of the visual field direction instruction mark 121C, the visual field of the user (user A) gradually approaches the visual field of the user C. Accordingly, the acute projection of the visual field direction instruction mark 121C is gradually reduced. Furthermore, when the visual field of the user C narrower than the visual field of the user (user A) is included in the visual field of the user (user A), the acute projection of the visual field direction instruction mark 121C disappears as illustrated in FIG. 9, and visual field range display 141C representing the visual field of the user C is superimposed and displayed on the visual field image 111A.

Therefore, the size of the projection of the visual field direction instruction mark 121C superimposed on the visual field image 111A displayed on the display apparatus 22 used by the user A and the visual field range display 141C allow the user A to figure out the proximity and the degree of coincidence (overlap) of the visual field of the user (user A) and the visual field of the other user (in this case, user C).

Furthermore, when the projection of the visual field direction instruction mark 121C disappears, it can be determined that the user (user A) and the other user (in this case, user C) are viewing the same thing. Therefore, the user A and the user C can perform communication, such as exchange of messages, in this state, and the situation such as miscommunication can be suppressed. Note that the visual field direction instruction mark 121C and the visual field range display 141C are types of visual field position instruction image indicating the position of the visual field of the user C.

<Method Using Visual Field Direction Instruction Line>

Figure 10:
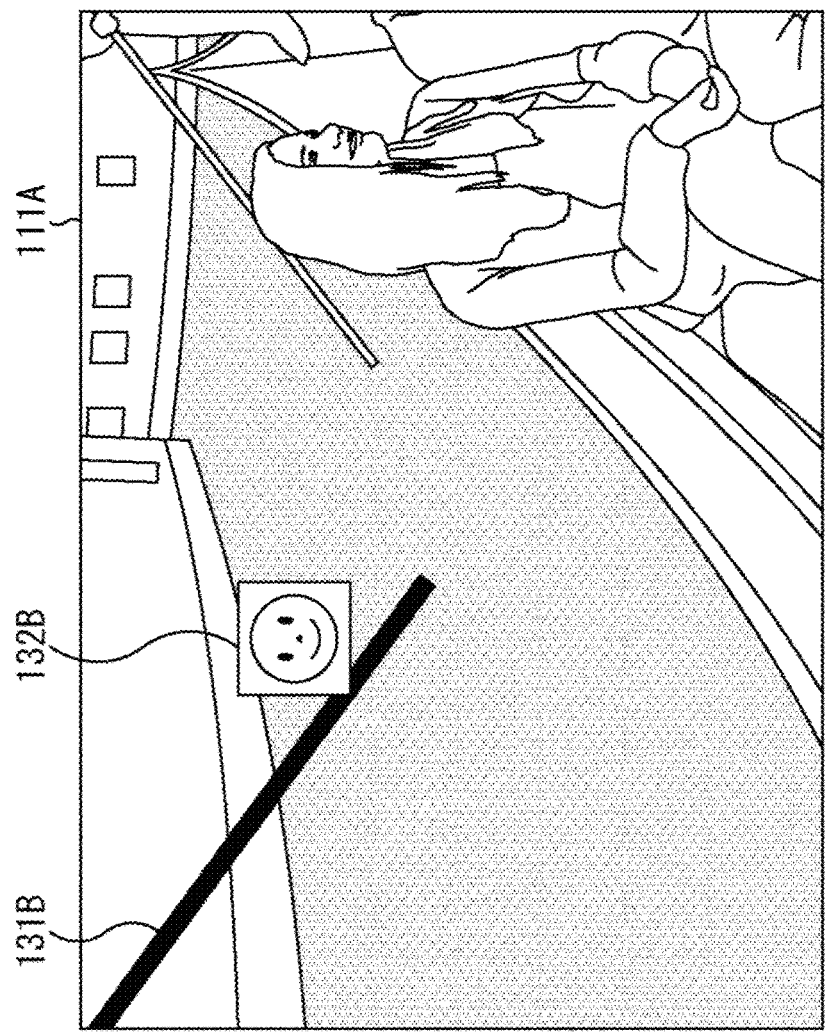
FIG. 10 is a diagram illustrating an example of display in a case where a visual field direction instruction line is superimposed and displayed on the visual field image.

FIG. 10 is a diagram illustrating an example of display in a case where a visual field direction instruction line 131, which represents the direction of the location of the visual field of another user sharing the content, is superimposed and displayed as a symbol image, which indicates the position of the visual field of the other user, on the visual field image 111A, which is displayed on the display apparatus 22 used by the user.

In the example of display of FIG. 10, a visual field direction instruction line 131B is superimposed and displayed on the visual field image 111A corresponding to the visual field of the user A.

In the visual field direction instruction line 131B, one end of the straight line represents the direction of the location of the visual field of the user B (in this case, upper left direction). In addition, an icon 132B corresponding to the user B is superimposed and displayed on the visual field image 111A near the visual field direction instruction line 131B in order to indicate that the visual field direction instruction line 131B corresponds to the user B.

The visual field direction instruction line 131B superimposed on the visual field image 111A displayed on the display apparatus 22 used by the user A allows the user A to figure out the direction of the location of the visual field of the other user sharing the content (in this case, user B). The user A can, for example, rotate the head in the upper left direction along the visual field direction instruction line 131B to move the visual field of the user (user A) to the visual field of the user B.

This can suppress the situation, such as miscommunication, in the case where the users perform communication, such as exchange of messages, and smooth communication between the users can be assisted.

<3. Tracking Image that Tracks Visual Field of Another User>

The user apparatus 20 can track the visual field of another user of another user apparatus 20 based on the visual field information of the other user apparatus 20 acquired from the server apparatus 40.

Figure 11B:
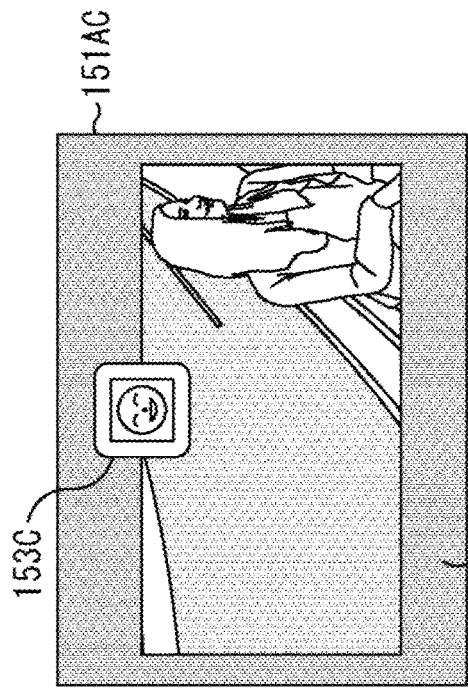
FIGS. 11A, 11B, and 11C are diagrams illustrating an example of display of a tracking image that tracks the visual field of the other user.
Figure 11A:
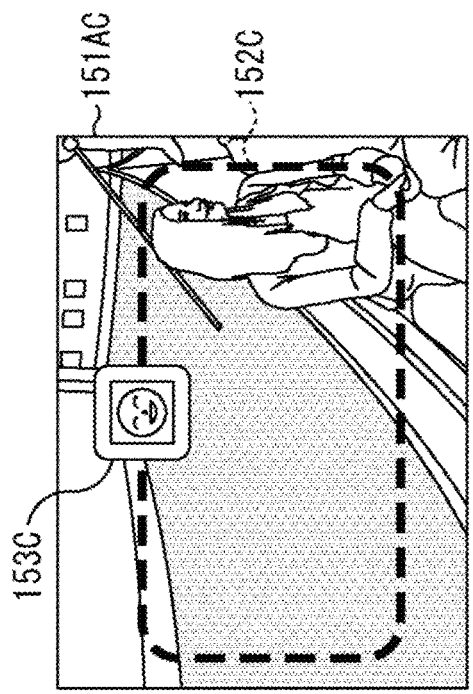
Figure 11C:
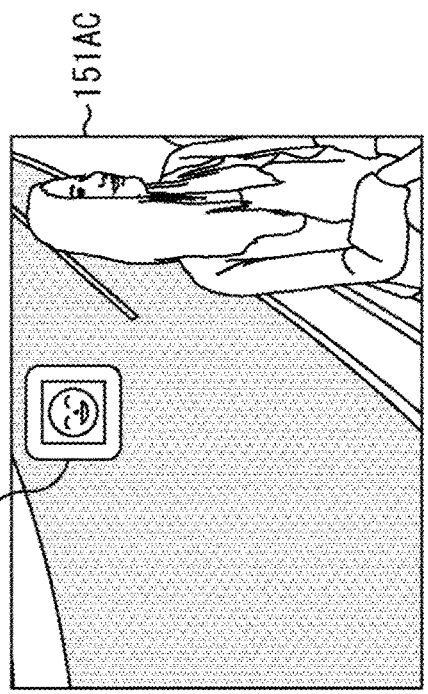

FIGS. 11A, 11B, and 11C are diagrams illustrating an example of display of a tracking image AC displayed on the display unit 73 of the display apparatus 22 when the user apparatus 20 used by the user A tracks the visual field of the user C in the case where the visual field image (range cut out as the visual field image from the content image) of the user A is larger than the visual field image of the user C so that the visual field of the user A is wider than the visual field of the user C.

The user apparatus 20 used by the user A can generate the tracking image AC by cutting out, as a visual field image, an image in the visual field size of the user A or the visual field size of the user C with the center at the visual field center indicated in the visual field information of the user C, from the content image based on the visual field information of the user C.

In a tracking image 151AC illustrated in FIG. 11A, visual field range display 152C representing the visual field of the user C and an icon 153C corresponding to the user C are superimposed and displayed on the visual field image in the visual field size of the user A.

In the tracking image 151AC illustrated in FIG. 11B, masking display 154 is superimposed on a range outside the visual field of the user C in the visual field image in the visual field size of the user A, and the icon 153C corresponding to the user C is superimposed and displayed on the range of the visual field of the user C.

In the tracking image 151AC illustrated in FIG. 11C, the visual field image in the visual field size of the user C is expanded to correspond to the visual field size of the user A, and the icon 153C corresponding to the user C is further superimposed and displayed.

Figure 12A:
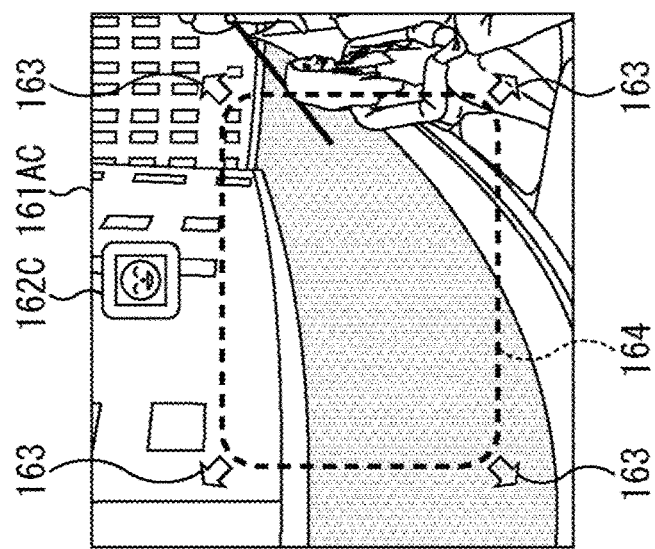
Figure 12A:
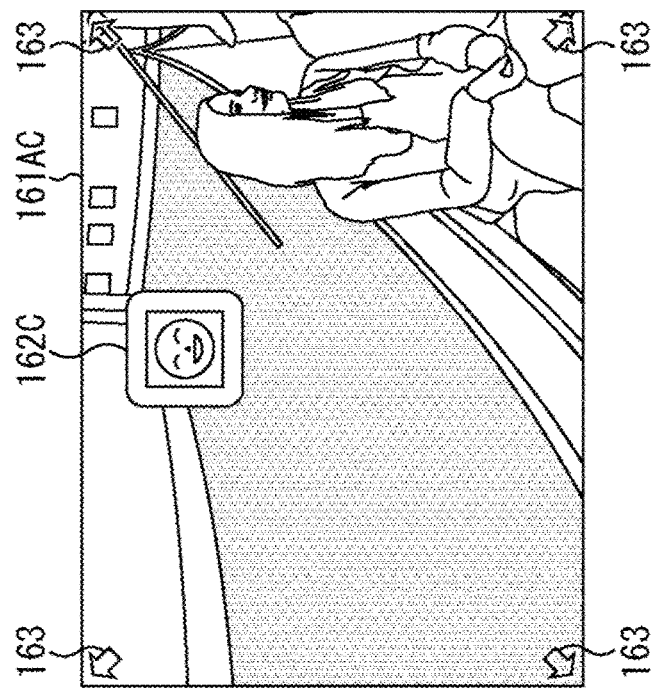

FIGS. 12A and 12B are diagrams illustrating an example of display of the tracking image AC displayed on the display unit 73 of the display apparatus 22 when the user apparatus 20 used by the user A tracks the visual field of the user C in the case where the visual field image of the user A is smaller than the visual field image of the user C so that the visual field of the user A is narrower than the visual field of the user C.

In a tracking image 161AC illustrated in FIG. 12A, an icon 162C corresponding to the user C and an arrow 163 indicating that the visual field of the user C includes the visual field of the user A (indicating that the visual field of the user C is wider than the visual field of the user A) are superimposed and displayed on the visual field image in the visual field size of the user A.

In the tracking image 161AC illustrated in FIG. 12B, the icon 162C, the arrow 163, and visual field range display 164 representing the visual field of the user A are superimposed and displayed on an image obtained by reducing the visual field image in the visual field size of the user C to a size within the visual field size of the user A.

The user apparatus 20 can switch the mode between a normal mode for determining the visual field image of the user displayed on the display apparatus 22 and a tracking mode for displaying the tracking images illustrated in FIGS. 11A, 11B, 11C, 12A, and 12B according to the motion of the head or the like of the user. According to the tracking mode, the user can view the scene viewed by another user.

<4. Highlighting User Speaking>

When the visual fields (including the directions of the visual fields) of other users are always displayed on the visual field image 111A corresponding to the visual field of the user A, it may become difficult for the user A to see the visual field image 111A in a case where the number of other users increases. Therefore, in displaying the visual fields of the other users, for example, the visual field of only the user transmitting a message in communication between the users may be displayed, or the visual field of the user transmitting a message may be highlighted.

Figure 13:
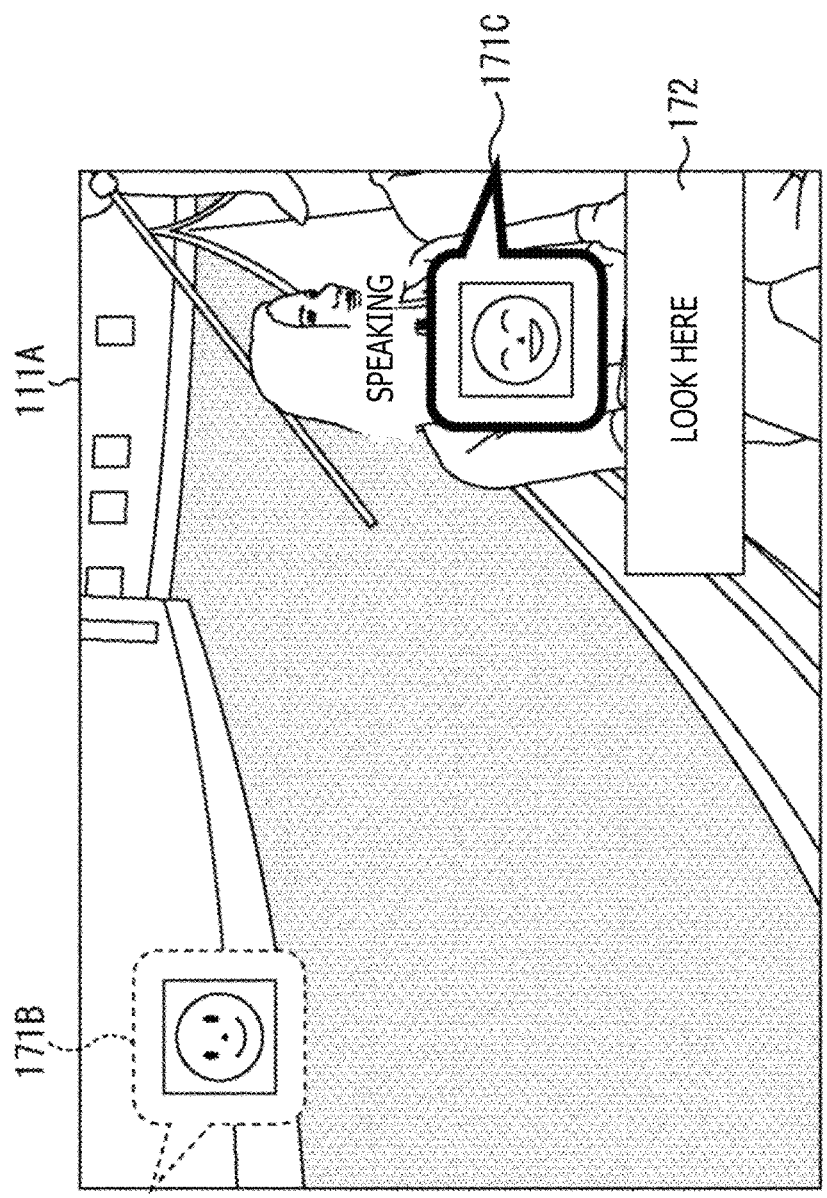
FIG. 13 is a diagram illustrating an example of display in a case where a visual field direction instruction mark corresponding to the user speaking is highlighted.

FIG. 13 is a diagram illustrating an example of display in a case where the user apparatus 20 used by the user A highlights a visual field direction instruction mark 171C corresponding to the user C in response to transmission of a message by the user C.

In the case of FIG. 13, the visual field direction instruction mark 171C highlighted by thickening the contour line is superimposed on the visual field image 111A corresponding to the visual field of the user A. Furthermore, text display 172 (in the case of FIG. 13, "LOOK HERE") corresponding to the speech of the user C is superimposed and displayed below the visual field direction instruction mark 171C.

Note that to allow the user A to visually and more easily distinguish the other user transmitting the message and another user not transmitting a message, a visual field direction instruction mark 171B corresponding to the other user not transmitting the message (in this case, user B) may be displayed by changing the contour to a broken line or by reducing the brightness to make the visual field direction instruction mark 171B inconspicuous.

<5. Visual Field Information Presentation Process of User Apparatus 20>

Next, a visual field information presentation process for presenting the locations of the visual fields of the other users to the user while displaying the visual field image corresponding to the visual field of the user on the display apparatus 22 of the user apparatus 20 will be described.

Figure 14:
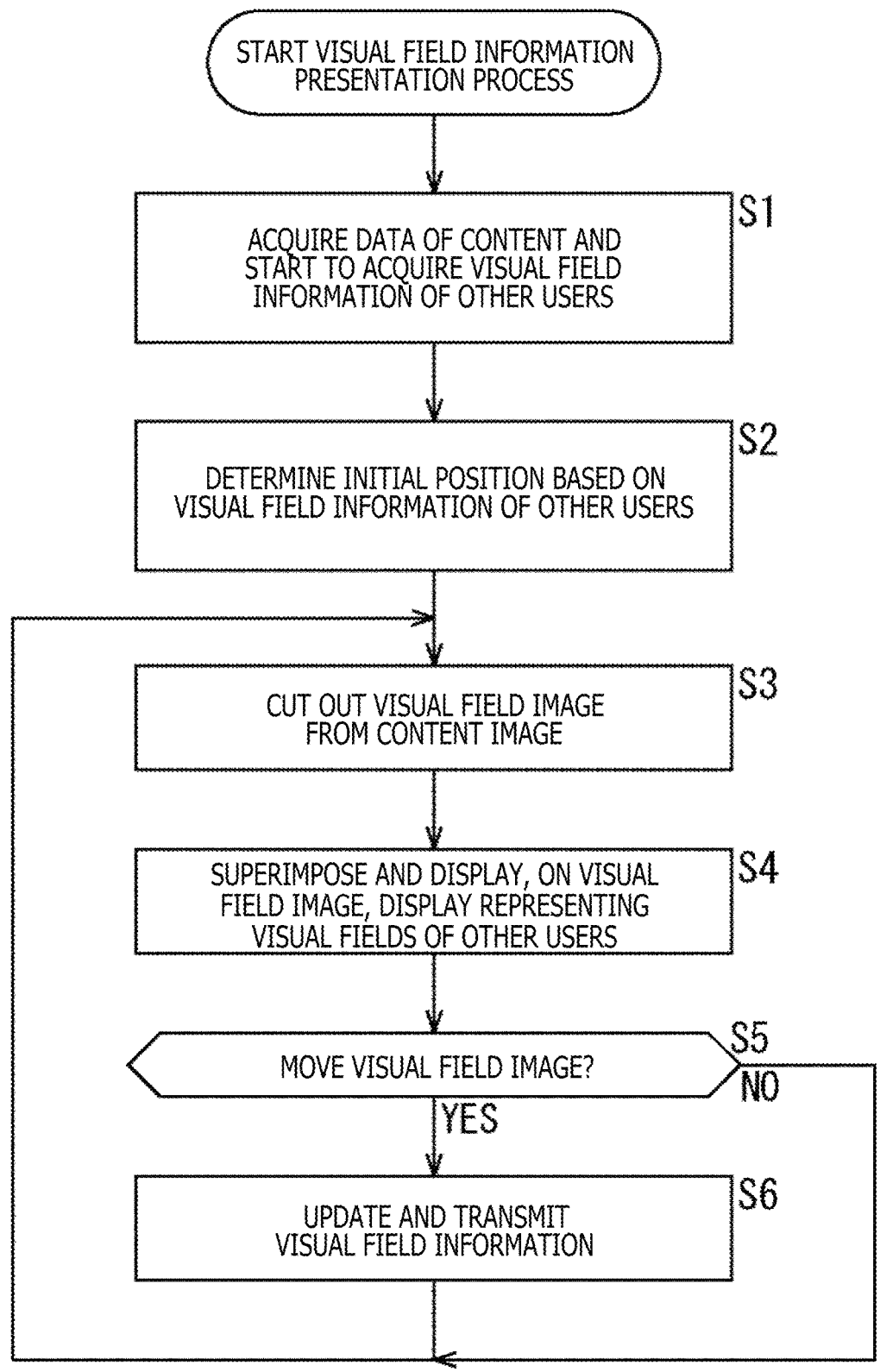
FIG. 14 is a flow chart describing a visual field information presentation process.

FIG. 14 is a flow chart describing the visual field information presentation process.

In the information processing apparatus 21 (FIG. 2) of the user apparatus 20 used by the user A, the communication unit 51 connects to the server apparatus 40 through the Internet 31 and acquires the data of the content in step S1. The data of the content acquired from the server apparatus 40 is held in the content holding unit 52.

Furthermore, in step S1, the communication unit 51 starts to acquire the visual field information of the other users (for example, users B and C) viewing the same content from the visual field information management unit 42 of the server apparatus 40.

In step S2, the visual field image determination unit 53 sets, as an initial position of the visual field center, a position in a range viewed by more other users based on the visual field information of the other users. Furthermore, the visual field image determination unit 53 determines the visual field image (corresponding to the visual field) of the user in the content image based on the initial position of the visual field center and the visual field size. By setting the initial position of the visual field center at the position in the range viewed by more other users, the user (in this case, user A) can immediately view, as the visual field image, the same image as the other users, and the users can easily communicate.

In step S3, the image cutting unit 54 cuts out the visual field image 111A (FIG. 5) determined by the visual field image determination unit 53 from the content image to generate the visual field image 111A.

In step S4, the display control unit 60 superimposes, on the visual field image 111A, visual field position instruction images as display representing the visual fields of the other users. Subsequently, the display control unit 60 supplies an image signal of the visual field image 111A including the superimposed visual field position instruction images to the display apparatus 22 and causes the display unit 73 to display the visual field image 111A.

Here, the visual field position instruction images include the wide area image 112 (FIG. 6), symbol images, and the like. The symbol images include the visual field direction instruction marks 121B and 121C (FIG. 7), the visual field direction instruction line 131B (FIG. 10), and the like.

In step S5, the visual field image determination unit 53 determines whether or not to move the visual field image displayed on the display unit 73 based on the amount of movement (angle of rotation) of the line of sight and the amount of movement (angle of rotation) of the head. Here, in a case where the visual field image determination unit 53 determines to move the visual field image, the process proceeds to step S6.

In step S6, the visual field information holding unit 55 updates and holds the visual field information of the user based on the amount of movement of the line of sight and the amount of movement of the head and outputs the visual field information to the communication unit 51. The communication unit 51 notifies the updated visual field information of the user to the server apparatus 40 through the Internet 31. Note that the visual field information notified to the server apparatus 40 is to be supplied to the other user apparatuses 20.

The visual field image determination unit 53 determines the visual field image corresponding to the visual field of the user in the content image based on the updated visual field information. The process returns to step S3, and the subsequent process is repeated until the end of the reproduction of the content. In this way, the visual field image corresponding to the visual field of the user in the content image is determined based on the updated visual field information, and the visual field image displayed on the display unit 73 moves based on the amount of movement of the line of sight of the user and the amount of movement of the head (the range cut out as the visual field image from the content image moves).

Furthermore, in a case where the visual field image determination unit 53 determines not to move the visual field image in step S5, the visual field image determination unit 53 sets again the visual field image of the last time as the visual field image corresponding to the visual field of the user, and step S6 is skipped. The process then returns to step S3, and the subsequent process is repeated until the end of the reproduction of the content.

According to the visual field information presentation process described above, the visual fields (including the directions of the locations of the visual fields) of the other users are displayed to present the visual fields of the other users to the user. The user can move the line of sight and the head to move the visual field of the user based on the presentation, and the user can immediately see the same images as the other users. This can suppress the situation, such as miscommunication, in the communication between the users.

<6. Switch of Visual Field Image and Wide Area Image>

In the description so far, the wide area image (FIG. 6) is superimposed and displayed on the visual field image (FIG. 5) or displayed on another display device. However, the display apparatus 22 can switch and display the visual field image and the wide area image.

In switching the display of the display apparatus 22 from the visual field image to the wide area image, the visual field image may be instantaneously switched to the wide area image. In addition, the visual field image may be zoomed out, or the point of view may be moved to thereby gradually change the visual field image to the wide area image.

The visual field image can be switched to the wide area image when, for example, a user (for example, user A) wants to know the visual field (including the direction of the visual field) of another user (for example, user B). In addition, even in a case where there are no other users, the visual field image can be switched to the wide area image when the user A wants to figure out the position of the visual field of the user in the entire content image or the point of view of the user (in a case where the content is a free viewpoint image).

Examples of a trigger for switching the visual field image to the wide area image are as follows.

For example, an operation of a key of a remote control included in the input unit 58 (FIG. 2) operated by the user may be the trigger, and the visual field image may be switched to display the wide area image only in a period in which the user is pressing the key of the remote control.

In addition, a voice command spoken by the user may be the trigger, for example. The visual field image may be switched to the wide area image in response to a predetermined voice command "zoom out" spoken by the user, and the wide area image may be returned to the visual field image in response to a voice command "return" spoken by the user.

In addition, a motion of the head of the user may be the trigger, for example. The visual field image may be switched to a bird's eye view or the like as a wide area image when the user faces right below. The visual field image may be switched to an image of a 2D map as a wide area image corresponding to the content space when the user faces right above.

In addition, communication between users may be the trigger, for example. The image may be switched to the wide area image when the user starts to communicate with another user or when the distance from another user during communication has increased so that the other user is out of the visual field. After that, the visual field image and the wide area image may be switched in response to a predetermined gesture operation, such as a nod of the user or a motion of the hand.

In addition, an event in the content may be the trigger, for example. In response to the event, the visual field image may be switched to the wide area image including the place of the event.

Furthermore, in a case where, for example, the content is a live image in a real space, generation of an alert in the real space (for example, discovery of suspicious person, fire, operation of emergency button, or the like) may be the trigger. In response to the alert, the visual field image may be switched to the wide area image including the location of the generation of the alert.

Furthermore, the content of a conversation as communication between users may be analyzed, and the switch between the visual field image and the wide area image may be triggered when the result of analysis indicates predetermined content.

In addition, the visual field image and the wide area image may be switched in response to a gesture (action) of the user looking to the left or right or a gesture of pulling.

Next, FIGS. 15A, 15B, 15C, 15D, and 15E are diagrams illustrating an example of display of the wide area image switched from the visual field image. FIG. 15A is an example of display of a visual field image 181 displayed on the display apparatus 22 worn by the user A.

FIG. 15B is an example of display of a wide area image 182 using a bird's eye view switched from the visual field image 181 (FIG. 15A) in response to the detection of the trigger. A visual field mark 183 indicating the position (that is, point of view) of the user and the direction of the visual field is superimposed on the wide area image 182. The bird's eye view is displayed at an angle that the visual field mark 183 is out of the shadow of objects, such as main buildings, on the wide area image 182, while it is prioritized to make it easy to understand the current visual field of the user indicated by the visual field mark 183.

FIG. 15C is an example of display of a wide area image 184 using an equirectangular projection switched from the visual field image 181 (FIG. 15A) in response to the detection of the trigger. Visual field range display 185A representing the visual field of the user A is superimposed on the wide area image 184.

FIG. 15D is an example of display of a wide area image 186 using an equirectangular projection switched from the visual field image 181 (FIG. 15A) triggered when, for example, the user A starts to communicate with the user B. Visual field range display 187A representing the visual field of the user A and visual field range display 187B representing the visual field of the user B are superimposed on the wide area image 186.

FIG. 15E is an example of display of a wide area image 188 using an equirectangular projection switched from the visual field image 181 (FIG. 15A) triggered when, for example, the user A starts to communicate with the user B. The wide area image 188 is an expanded image of the range including the visual fields of the user A and the user B. Visual field range display 189A representing the visual field of the user A and visual field range display 189B representing the visual field of the user B are superimposed on the wide area image 188.

As for the wide area image, when the visual fields of a plurality of users significantly vary in the case where the plurality of users communicates while viewing the content, an aerial view or the like including the visual fields of the plurality of users (visual field images of the plurality of users) at the same time can be adopted as the wide area image and automatically displayed. As for the content of AR, for example, a separate camera can be used to take a picture of the real world, and the image can be used to generate the wide area image.

Furthermore, in a case where there are a user wearing AR glasses and another user remotely viewing the content of the image of a live camera arranged in the space of the user, an aerial image including the visual fields of the user and the other user at the same time can be adopted as the wide area image and automatically displayed during the communication between the user and the other user.

Furthermore, in the case where the visual fields of a plurality of users significantly vary, the display of the wide area image can be prioritized over the display of the visual field image.

Furthermore, in a case where it is estimated that a plurality of users pays attention to different objects in the content image, an image including the different objects (image in which the different objects can be viewed) can be adopted as the wide area image.

In addition, the wide area image can be an image, in which the image is reduced to display, at a super wide angle, a predetermined range around the visual field image of the user in the content image, and the positions of the other users are displayed.

Furthermore, as for the aerial view as the wide area image, the point of view of the aerial view and the angle of view of the aerial view can be selected based on the direction of the HMD as the display apparatus 22.

The display of the wide area image may be triggered when the user recognizes another user and starts a conversation, that is, for example, when the user selects the other user from a menu including display of the icons of the other users and starts a voice call or a text chat.

In addition, the display of the wide area image may be triggered when another user moves away from the user in the middle of a conversation, such as a voice call, between the user and the other user.

Note that in the case where the content is a free viewpoint image, an image including a scene of the content space in the free viewpoint image viewed in an arbitrary direction from an arbitrary point of view can be the visual field image, and the visual field image can be displayed on the HMD as the display apparatus 22. However, the movable range of the user wearing the HMD is limited. Therefore, as for the movement of the visual field image, the user may be allowed to move the image in the rotation direction, and the user apparatus 20 may automatically perform the parallel translation. In the case of viewing such a free viewpoint image, the wide area image can also be displayed as described above.

In addition, the wide area image can be displayed to cover the entire field of view of the user. Furthermore, the wide area image can be displayed below the visual field of the user so as to be attached to the ground when the user faces below. In addition, a window can be displayed in part of the visual field image, and the wide area image can be displayed in the window.

Furthermore, the wide area image can be faintly displayed with lower brightness than the visual field image.

According to the wide area image, in a case where the visual fields of the user and the other user are different so that the communication is not smooth, the wide area image including the visual fields of the user and the other user can be displayed, and the obstacle (gap) of the communication can be improved.

Furthermore, according to the wide area image, the user who cannot recognize the position in the free viewpoint image can easily return to a desirable position or can make a long-distance movement in a short time.

<Image Switching Process of Switching Visual Field Image and Wide Area Image>

Figure 16:
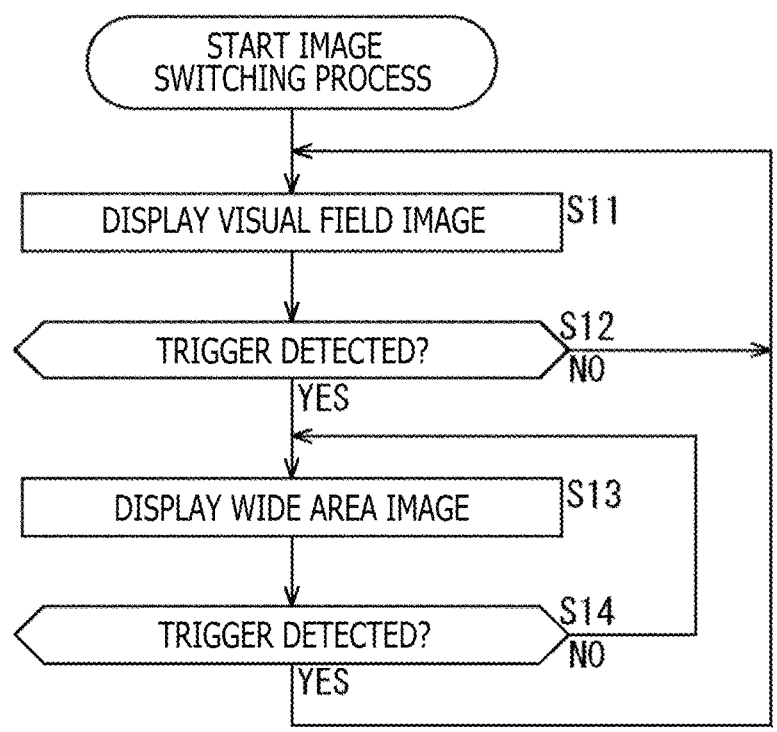
FIG. 16 is a flow chart describing an image switching process.

Next, FIG. 16 is a flow chart describing an image switching process of switching the visual field image and the wide area image.

However, the movement of the visual field of the user will not be mentioned in the description of the image switching process.

In step S11, the information processing apparatus 21 generates the visual field image corresponding to the visual field of the user and causes the display unit 73 to display the generated visual field image.

Specifically, the image cutting unit 54 of the information processing apparatus 21 cuts out the visual field image from the content image held in the content holding unit 52 to generate the visual field image, and the display control unit 60 supplies the image signal of the generated visual field image to the display apparatus 22 to cause the display unit 73 to display the visual field image.

In step S12, the information processing apparatus 21 determines whether or not there is a trigger for instructing a switch between the visual field image and the wide area image. Specifically, the trigger detection unit 59 of the information processing apparatus 21 determines whether or not a wide area trigger for instructing a switch to the wide area image is detected based on a key operation from the user, a speech of the user, an image of the user, or the like input by the input unit 58. Here, in a case where the trigger detection unit 59 determines that the wide area trigger is not detected, the process returns to step S11. As a result, the visual field image is still displayed on the display unit 73.

On the other hand, in a case where the trigger detection unit 59 determines that the wide area trigger is detected in step S12, the process proceeds to step S13.

In step S13, the information processing apparatus 21 generates the wide area image, and the display apparatus 22 switches the display of the display unit 73 from the visual field image to the wide area image.

Specifically, for example, the display control unit 60 superimposes the visual field range display representing the visual field of each user (for example, visual field range display 187A and 187B of FIG. 15D) on the entire image 100 (FIG. 4) of the content image held in the content holding unit 52 to thereby generate the wide area image (for example, wide area image 186 of FIG. 15D) and supplies the image signal of the generated wide area image to the display apparatus 22 to cause the display unit 73 to display the wide area image.

Note that the display control unit 60 can determine the display position of the visual field range display representing the visual field of each user based on the visual field information of each user held in the visual field information holding unit 55.

After step S13, the process proceeds to step S14, and the trigger detection unit 59 determines whether or not the visual field trigger for instructing a switch to the visual field image is detected based on a key operation from the user, a speech of the user, an image of the user, or the like input by the input unit 58. Here, in a case where the trigger detection unit 59 determines that the visual field trigger is not detected, the process returns to step S13. As a result, the wide area image is still displayed on the display unit 73.

In a case where the trigger detection unit 59 determines that the visual field trigger is detected in step S14, the process returns to step S11, and the display of the display unit 73 is switched to the visual field image.

According to the image switching process described above, the user can perform an operation, a speech, an action, a gesture, or the like as a trigger to switch the visual field image and the wide area image.

The user viewing the wide area image can figure out the visual fields of the other users, and the situation, such as miscommunication, can be suppressed in the communication between the users.

In addition, the user viewing the wide area image can figure out the visual field and the point of view of the user (position of the user in the content space in the case where the content is a free viewpoint image). Therefore, in a case where, for example, the user cannot recognize the position of the user in the content space, the user can quickly return to a desirable position.

<7. Movement of Visual Field Image>

Next, movement of the visual field image will be described.

In the HMD, the user rotates the head to move the visual field image (range of the visual field image) to be cut out from the content image, and as a result, the visual field of the user moves. However, for example, in a case of moving the visual field image to right behind the visual field image currently displayed on the display apparatus 22 in the content image, the body also needs to be rotated along with the head, because a person usually cannot rotate only the head 180 degrees. Therefore, if the user frequently looks to the left and right or the back while wearing the HMD, the user gets physically tired.

Thus, the user apparatus 20 in the present embodiment moves the visual field image (visual field center indicated in the visual field center information included in the visual field information for determining the visual field image) more than the amount of rotation of the head to reduce the physical fatigue of the user. That is, the angle of rotation of the visual field image is made larger than the angle of rotation of the head of the user. For example, the visual field image is rotated and moved 180 degrees in the horizontal direction when the user rotates the head 90 degrees in the horizontal direction.

Figure 17B:
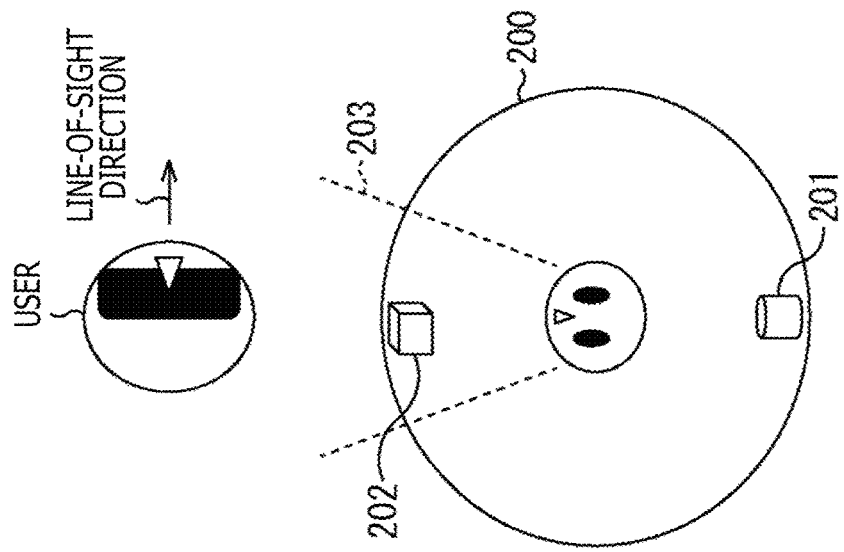
FIGS. 17A and 17B are diagrams illustrating an example in which the visual field image is moved more than an amount of rotation of the head of the user.
Figure 17A:
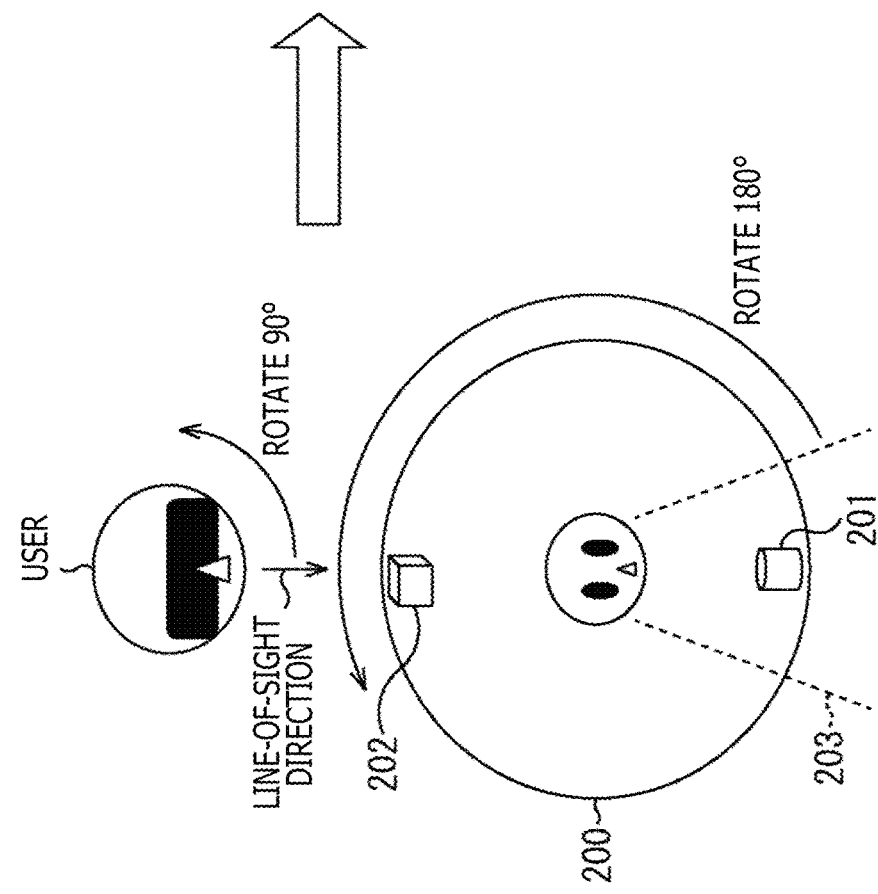

FIGS. 17A and 17B are diagrams illustrating an example in which the visual field image is rotated and moved more than the amount of rotation of the head of the user.

FIG. 17A illustrates a case of viewing, from above, a state in which the user faces the front in a predetermined direction and views a spherical image as a content image 200. In the content image 200, there is an object 201 in front of the user, and there is an object 202 behind the user. In this case, the object 201 exists in a visual field image (range of visual field image) 203 to be cut out from the content image 200 when the user faces the front, and the user can visually recognize the object 201. On the other hand, the object 202 exists outside the visual field image 203 of the user, and the user cannot visually recognize the object 202.

When the user rotates the head 90 degrees in this state, the visual field image 203 is rotated, for example, 180 degrees, which is larger than the angle of rotation of the head, in the same direction as the rotation of the head in the content image 200 as illustrated in FIG. 17B. In this case, the object 201 exists outside the visual field image 203 after the rotation, and the user cannot visually recognize the object 201. However, the object 202 exists in the visual field image 203 after the rotation, and the user can visually recognize the object 202.

However, in a case where the visual field image is simply moved by equal to or more than the amount of rotation of the head as illustrated in FIGS. 17A and 17B, the user may feel, for example, unpleasant or sick. Therefore, in the user apparatus 20, the visual field image can be rotated and moved more than the amount of rotation of the head only in a case where the user takes an action which can be assumed that the user is strongly willing to greatly move the visual field or under a condition that the user is unlikely to notice a large movement of the visual field.

<Movement of Visual Field Image According to Movement of Line of Sight>

The user apparatus 20 can move the visual field image to thereby move the visual field of the user when only the line of sight is moved without the rotation of the head.

FIGS. 18A, 18B, 19A, and 19B are diagrams illustrating the relationship between the motion of the line of sight of the user and the movement of the visual field image.

FIG. 18A is an example of an entire image 190 obtained by developing the content image on a plane, and a range 191 on the entire image 190 indicates a range cut out as a visual field image 192 (FIG. 18B) to be displayed on the display unit 73 of the display apparatus 22. FIG. 18B is an example of display of the visual field image 192, and an X mark indicates a line-of-sight position 195 of the user on the visual field image 192. In the case of FIG. 18B, the line-of-sight position 195 is positioned at the lower center of the visual field image 192.

Figure 19B:
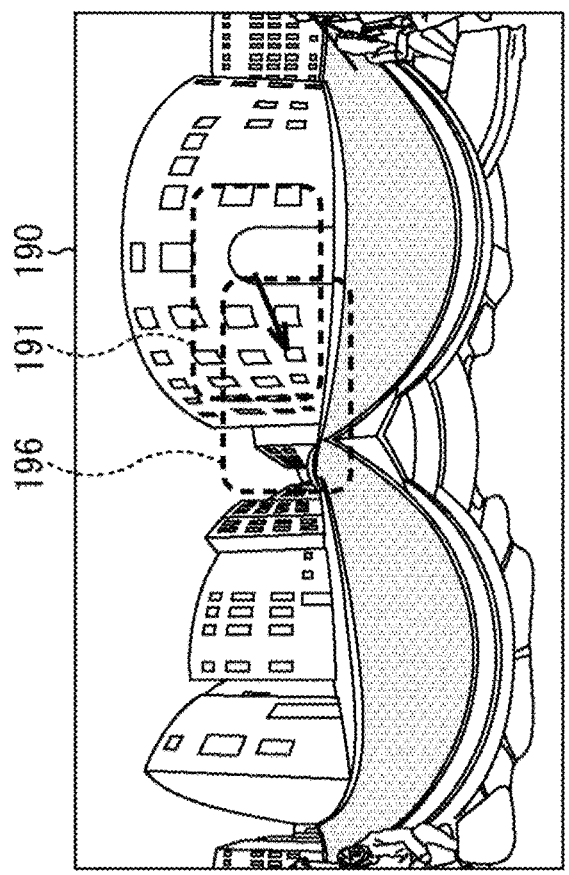
FIGS. 19A and 19B are diagrams illustrating a relationship between the motion of the line of sight of the user and the movement of the visual field image.
Figure 19A:
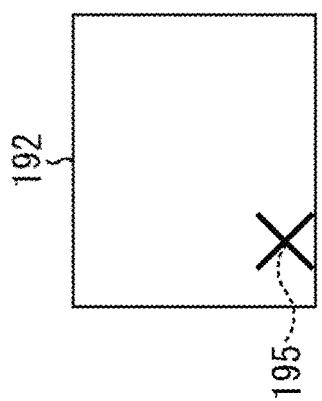

FIG. 19A indicates a motion of the line of sight of the user. In FIG. 19A, the line-of-sight position 195 of the user is moved to the lower side of the left edge of the visual field image 192. FIG. 19B illustrates a range cut out as the visual field image after the movement of the visual field image according to the movement of the line of sight, that is, after the movement of the line of sight illustrated in FIG. 19A.

In a case where the user moves the line of sight so that the line-of-sight position 195 approaches the edge of the visual field image as illustrated in FIG. 19A, it can be assumed that the user is willing to see the outside the range 191 of the current visual field image. Therefore, the visual field image determination unit 53 moves the visual field image based on the line-of-sight position 195 in response to the approach of the line-of-sight position 195 to the edge of the visual field image. That is, the range cut out as the visual field image is moved from the range 191 (FIG. 17A) to a range 196 (FIG. 18B) in the same direction as the movement direction of the line of sight. The movement of the visual field image based on the line-of-sight position 195 (of the line of sight after the movement) as described above can be made by, for example, setting the line-of-sight position 195 as the visual field center to determine the visual field image to be cut out from the content image.

<Movement of Visual Field Image According to Amount of Movement of Line of Sight and Amount of Rotation of Head>

In a case where the user swiftly moves the line of sight and rotates the head, it may be difficult for the user to notice a large movement of the visual field. Therefore, the user apparatus 20 moves the visual field image more than the amount of rotation of the head in a case where the angle of rotation as the amount of movement of the line of sight of the user and the amount of rotation (angle of rotation) of the head in a certain time are equal to or greater than a threshold.

However, in a case where the rotation direction of the head and the movement direction of the line of sight are different, it is likely that the user is viewing the object in the currently displayed visual field image, and the user may feel awkward or unpleasant if the movement of the visual field image is equal to or greater than the actual rotation of the head in such a state. Therefore, in a case where the rotation direction of the head and the movement direction of the line of sight are opposite directions, the movement of the visual field image is made equal to or greater than the actual rotation of the head only in a case where the difference between the rotation of the head and the movement of the line of sight (line-of-sight movement angle described later) is changed more than a threshold within a certain time.

<Definition of Line-of-Sight Movement Angle and Head Rotation Angle>

Figure 20:
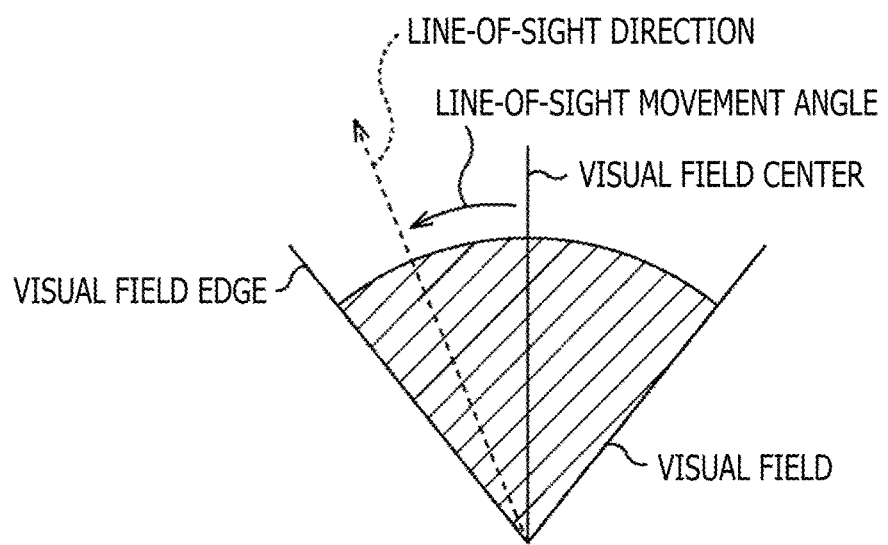
FIG. 20 is a diagram for describing a line-of-sight movement angle.

FIG. 20 is a diagram for describing definition of a line-of-sight movement angle representing the amount of movement of the line of sight of the user, and FIG. 20 illustrates a state of viewing, from above, the visual field of the user provided by the display apparatus 22. As illustrated in FIG. 20, an angle from a visual field middle representing the middle of the visual field to a line-of-sight direction after the movement of the line of sight is defined as a line-of-sight movement angle representing the angle of rotation that is the amount of motion of the line of sight of the user. Furthermore, for example, an angle from the visual field middle to the left edge of the visual field is defined as a positive line-of-sight movement angle, and an angle from the visual field middle to the right edge of the visual field is defined as a negative line-of-sight movement angle.

Figure 21:
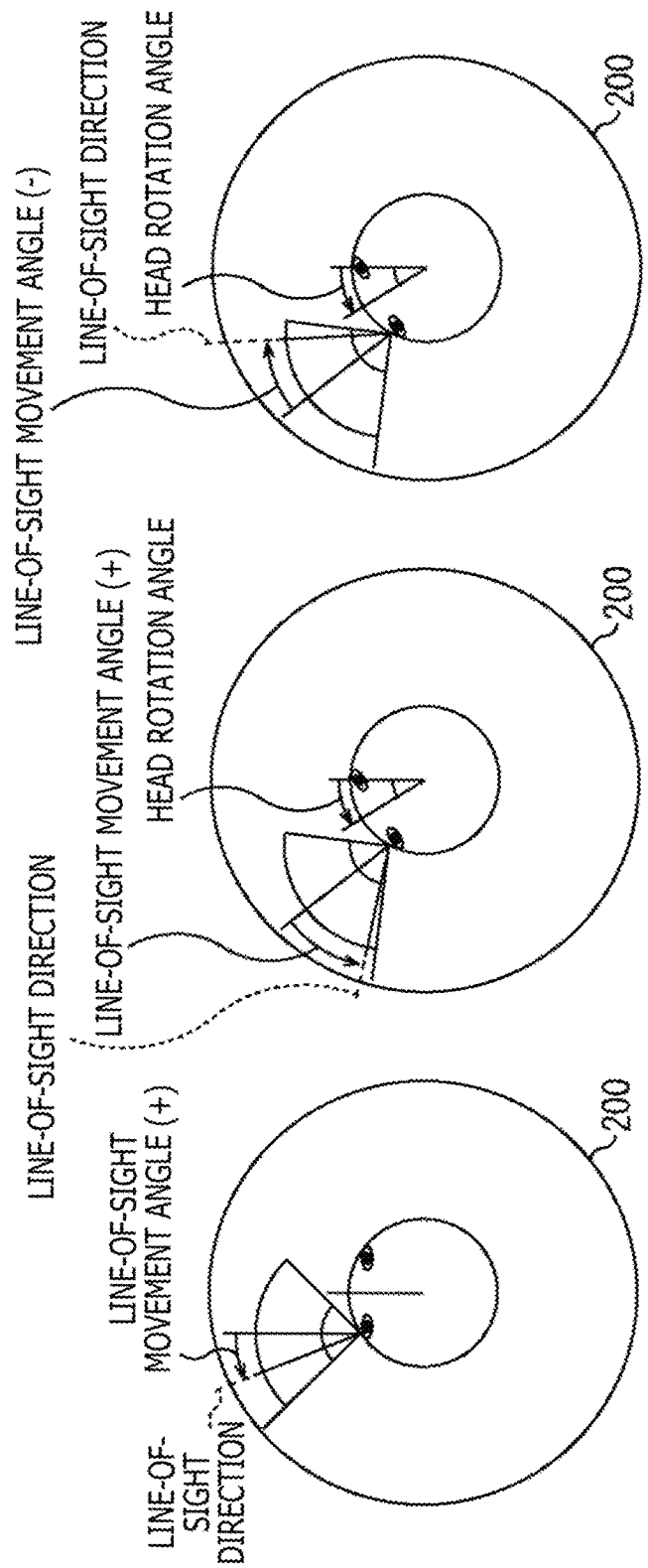
FIGS. 21A, 21B, and 21C are diagrams for describing a head rotation angle.

FIGS. 21A, 21B, and 21C are diagrams for describing the definition of the head rotation angle representing the amount of rotation of the head of the user, and FIGS. 21A, 21B, and 21C illustrate a situation of viewing, from above, the state in which the user views a spherical image as the content image 200. The head rotation angle is defined such that a predetermined direction in which the head of the user is currently facing indicated by FIG. 21A is 0 degrees. Furthermore, for example, an angle from the predetermined direction to the left side is defined as a positive head rotation angle, and an angle from the predetermined direction to the right side is defined as a negative head rotation angle.

Note that in FIG. 21A, the head rotation angle is 0 degrees, and the line-of-sight movement angle is a positive value. In FIG. 21B, the head rotation angle is a positive value, and the line-of-sight movement angle is a positive value larger than the line-of-sight movement angle in FIG. 21A. In FIG. 21C, the head rotation angle is a positive value, and the line-of-sight movement angle is a negative value.

<Visual Field Image Movement Process According to Amount of Movement of Line of Sight and Amount of Rotation of Head>

Next, a visual field image movement process according to the amount of movement of the line of sight and the amount of rotation of the head will be described.

Figure 22:
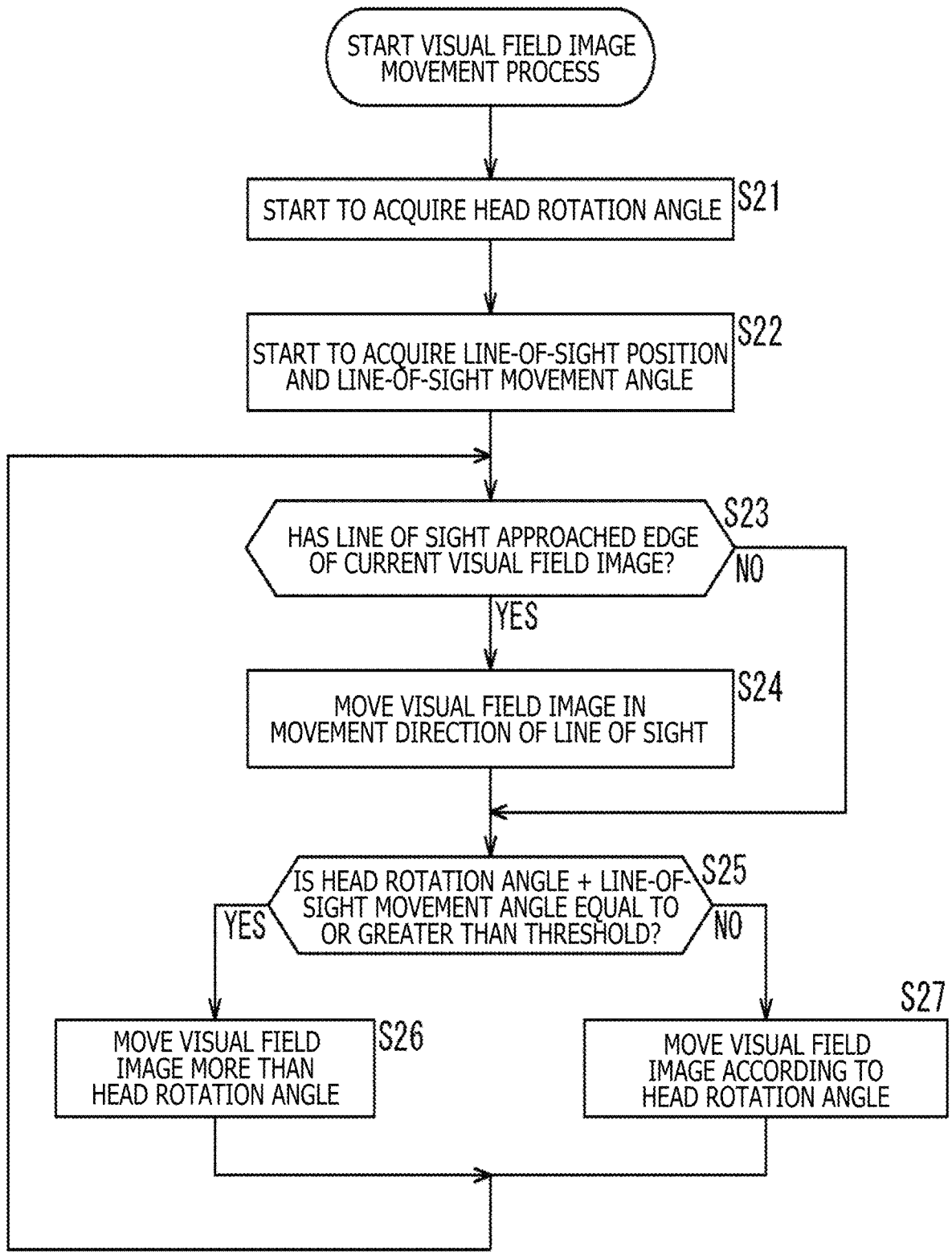

FIG. 22 is a flow chart describing a visual field image movement process of moving the visual field image according to the amount of movement of the line of sight and the amount of rotation of the head. The visual field image movement process is executed while the content is viewed.

In step S21, the head motion detection unit 72 of the display apparatus 22 (FIG. 3) starts to acquire the head rotation angle of the user. The visual field image determination unit 53 of the information processing apparatus 21 (FIG. 2) is notified of the acquired head rotation angle of the user. In step S22, the line-of-sight detection unit 71 of the display apparatus 22 detects the line of sight of the user and starts to acquire the line-of-sight position 195 (FIGS. 18A and 18B) and the line-of-sight movement angle of the user. The visual field image determination unit 53 of the information processing apparatus 21 is notified of the line-of-sight position 195 and the line-of-sight movement angle.

In step S23, the visual field image determination unit 53 determines whether or not the line of sight of the user has approached the edge of the visual field image based on the notification from the line-of-sight detection unit 71 and advances the process to step S24 when determining that the line of sight of the user has approached the edge of the visual field image. In step S24, the visual field image determination unit 53 moves the visual field image in the same direction as the movement direction of the line of sight from the current position in the content image. As a result, the visual field image displayed on the display unit 73 is moved in the direction of the line of sight.

Note that in a case where the visual field image determination unit 53 does not determine that the line of sight of the user has approached the edge of the visual field image in step S23, step S24 is skipped, and the process proceeds to step S25.

In step S25, the visual field image determination unit 53 determines whether or not a combined angle of the head rotation angle and the line-of-sight movement angle of the user in a certain time is equal to or greater than a threshold. In a case where the visual field image determination unit 53 determines that the combined angle of the head rotation angle and the line-of-sight movement angle of the user in a certain time is equal to or greater than the threshold, that is, for example, in a case where the head and the line of sight of the user move at equal to or higher than a certain speed in the same direction or in a case where one of the motions (rotations) of the head and the line of sight of the user is sufficiently larger than the other although the head and the line of sight move in opposite directions, the process proceeds to step S26. In step S26, the visual field image determination unit 53 moves (rotates) the visual field image more than the head rotation angle from the current position in the content image. Note that an arbitrary method can be used to calculate the amount of movement (angle of rotation) of the visual field image in moving the visual field image more than the head rotation angle. The process then returns to step S23, and the subsequent process is repeated.

On the other hand, in a case where the visual field image determination unit 53 determines that the combined angle of the head rotation angle and the line-of-sight movement angle of the user in a certain time is smaller than the threshold in step S25, the process proceeds to step S27. In step S27, the visual field image determination unit 53 moves the visual field image according to the head rotation angle from the current position in the content image. The process then returns to step S23, and the subsequent process is repeated.

According to the visual field image movement process described above, it can be assumed that the user is willing to view the outside (scene outside) the current visual field image (scene in the visual field image) in the case where the user moves the line of sight to the edge of the visual field image. Therefore, the visual field image is moved in the direction in which the user has moved the line of sight.

Furthermore, in the case where the combined angle of the head rotation angle and the line-of-sight movement angle of the user in a certain time is equal to or greater than the threshold, it may be difficult for the user to notice a large movement of the visual field. Therefore, the visual field image is moved more than the head rotation angle. As a result, the user can, for example, rotate the head in some degree to move the visual field to right behind without rotating the body. Therefore, the visual field can be easily moved in viewing the content, without increasing the physical load.

<8. Selection of Avatar to be Displayed>

In the case where the content is a free viewpoint image when a plurality of users views the same content, each user can arbitrarily change the point of view of the user. Therefore, another user (point of view of another user) may exist in the visual field of a user (visual field image viewed by the user). In such a case, a character as a model of the other user, such as an avatar, can be displayed (superimposed) at the position of the other user (point of view of the other user) in the visual field image (content space in the visual field image). The avatar may be a drawing or a photograph. In addition, the avatar may be two-dimensionally displayed or three-dimensionally displayed.

The display of the avatar of the other user on the visual field image can expect an advantageous effect that the users can more smoothly communicate.

However, if there are a plurality of other users in the visual field image, and all of the avatars corresponding to the plurality of other users are displayed, there may be a trouble, such as the visual field image is occupied by the avatars of the other users (avatars corresponding to the other users) or finding the partner (avatar) of communication becomes difficult.

Therefore, in the case of displaying the avatars, a mechanism of selecting the avatars to be displayed on the visual field image can be implemented.

In the user apparatus 20 of the present embodiment, the display control unit 60 (FIG. 2) of the information processing apparatus 21 selects the avatars to be displayed (superimposed) on the visual field image.

Figure 23:
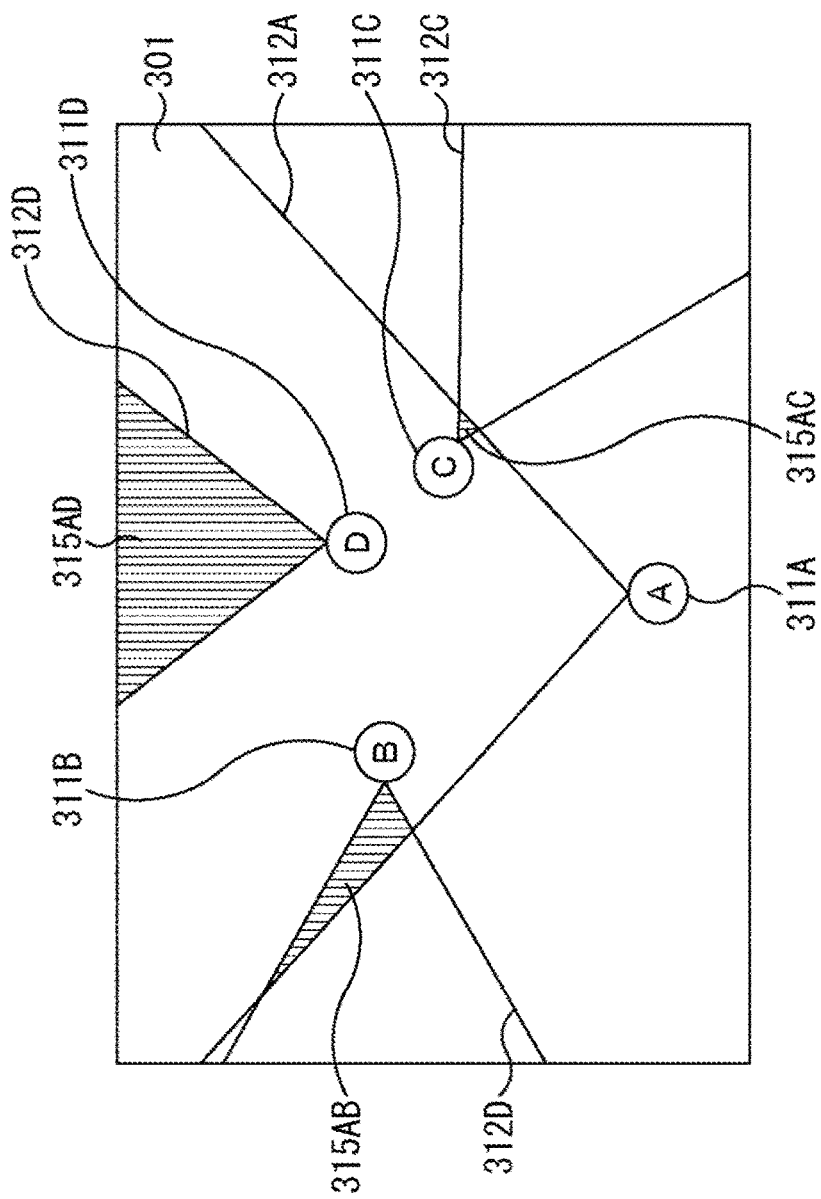

FIG. 23 is a plan view for describing a method of selecting avatars to be displayed on the visual field image in the display control unit 60. FIG. 23 illustrates a case of viewing, from above, a content space 301 in the case where a plurality of users views the content of the same free viewpoint image.

The content space 301 includes an avatar 311A corresponding to a user A, an avatar 311B corresponding to a user B, an avatar 311C corresponding to a user C, and an avatar 311D corresponding to a user D. FIG. 23 illustrates a range 312A in the visual field image of the user A, a range 312B in the visual field image of the user B, a range 312C in the visual field image of the user C, and a range 312D in the visual field image of the user D.

The display control unit 60 of the information processing apparatus 21 of the user apparatus 20 can set priorities of other users (avatars of other users), among the other users (avatars) existing in the visual field image of the user, in descending order of possibility of viewing the same thing as the user, that is, for example, in descending order of overlapping area of the range in the visual field image (here, area as viewed in the plan view of FIG. 23), and display the avatars of the other users according to the priorities.

For example, the display control unit 60 of the information processing apparatus 21 of the user apparatus 20 used by the user A specifies the other users (in the case of FIG. 23, users B, C, and D) existing in the range 312A in the visual field image of the user A and detects the overlapping areas of the range 312A in the visual field image of the user A and the ranges in the visual field images of the other users. Specifically, the display control unit 60 detects the area of each of an overlapping range 315AB of the range 312A and the range 312B in the visual field image of the user B, an overlapping range 315AC of the range 312A and the range 312C in the visual field image of the user C, and an overlapping range 315AD of the range 312A and the range 312D in the visual field image of the user D.

In the case of FIG. 23, the area of the overlapping range 315AD is the largest, followed by the overlapping range 315AB and the overlapping range 315AC. Therefore, the priorities of displaying the avatars are determined in order of the user D, the user B, and the user C. Furthermore, the avatars are displayed based on the priorities according to the number of avatars of the other users displayed in the visual field image of the user A. Note that the number of avatars of the other users displayed in the visual field image are determined in advance, and the user can change the number of avatars.

Figure 24:
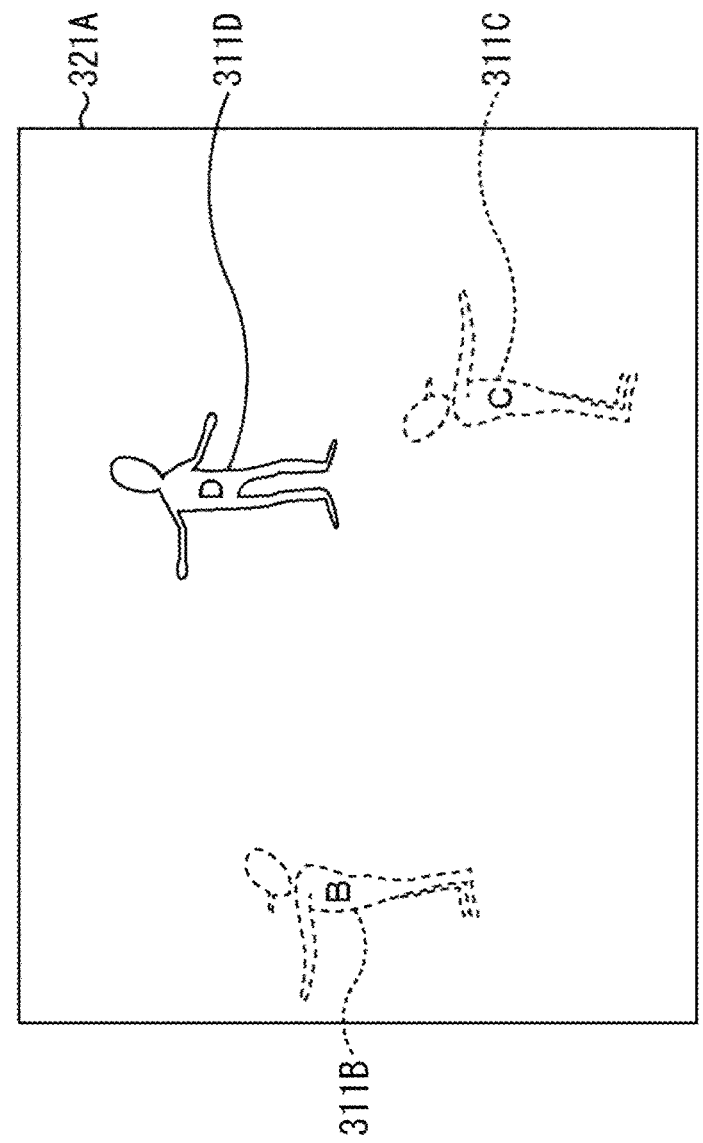

FIG. 24 is a diagram corresponding to the state illustrated in FIG. 23, the diagram illustrating an example of display of the visual field image of the user A displayed on the display apparatus 22 of the user apparatus 20 used by the user A and the avatars corresponding to the other users displayed in the visual field image. Here, FIG. 24 corresponds to a case where the number of avatars of the other users displayed in the visual field image is one.

As illustrated in FIG. 24, the avatar 311D corresponding to the user D indicated by a solid line is superimposed and displayed on the visual field image 321A of the user A. Note that the avatar 311B corresponding to the user B and the avatar 311 corresponding to the user C indicated by dotted lines are not displayed. However, in a case where the number of avatars of the other users displayed in the visual field image is two, the avatar 311D and the avatar 311B are displayed. In a case where the number of avatars of the other users displayed in the visual field image is three or more, the avatars 311D, 311B and 311C are displayed.

Note that here, the priority of the avatar to be displayed in the visual field image of the user A is set according to the overlapping area of the range in the visual field image of the user A and the range in the visual field image of another user. Therefore, the avatar of another user with the visual field close to the visual field image (range in the visual field image) of the user A tends to be preferentially displayed in the visual field image of the user A.

Other than setting the priority of displaying the avatar in the visual field image of the user A according to the proximity of the visual field of the other user and the visual field image of the user A as described above, the priority can be set according to the positional relationship between the visual field image (range in the visual field image) of the user A and the visual field of the other user. In this way, whether or not to display (superimpose) the avatar of the other user on the visual field image of the user A can be controlled according to the positional relationship between the visual field image of the user A and the visual field of the other user.

<Avatar Display Process>

Next, FIG. 25 is a flow chart describing an avatar display process of setting the priorities of the avatars to display the avatars as described above.

In step S31, the display control unit 60 reads the visual field information of the user and the visual field information of the other users held in the visual field information holding unit 55. In step S32, the display control unit 60 refers to the visual field information of the user and the other users to determine whether or not the visual field image of the user, that is, the visual field image (range in the visual field image) of the user determined according to the visual field information of the user, includes more than a predetermined number of other users (points of view of the other users). The predetermined number corresponds to the preset number of avatars of the other users displayed in the visual field image of the user.

In step S32, the process proceeds to step S33 in a case where the display control unit 60 determines that the visual field image of the user includes more than the predetermined number of other users (points of view of the other users). In step S33, the display control unit 60 refers to the visual field information of the user and the other users to set the priorities for the avatars of the other users in descending order of the size of the range where the visual field (range in the visual field image) overlaps the visual field image (range in the visual field image) of the user.

In step S34, the display control unit 60 determines the predetermined number of avatars of the other users (avatars corresponding to the other users) to be displayed in the visual field image of the user according to the set priorities and superimposes the determined avatars of the other users on the visual field image. In this way, the predetermined number of avatars are superimposed and displayed on the visual field image displayed on the display unit 73.

On the other hand, in a case where the display control unit 60 determines that the visual field image of the user does not include more than the predetermined number of other users (points of view of the other users) in step S32, all of the avatars of the other users existing in the visual field image of the user are to be displayed, and the process proceeds to step S35.

In step S35, the display control unit 60 determines that all of the avatars of the other users existing in the visual field image of the user are the avatars to be displayed in the visual field image and superimposes the determined avatars of the other users on the visual field image. In this way, equal to or smaller than the predetermined number of avatars are superimposed and displayed on the visual field image displayed on the display unit 73.

According to the avatar display process described above, the user can see only the other avatars considered to be viewing the same or similar visual field images, and the user cannot see the other avatars. This can suppress occurrence of a problem in communication, such as miscommunication with the other users corresponding to the avatars that can be viewed. This can also suppress a situation that the visual field of the user is occupied by the avatars.

In addition, the user may be able to arbitrarily set the priorities regarding the display of the avatars corresponding to the other users. In addition, the priorities may be set according to a history of communication, such as for example, the higher the number of exchanges of messages, the higher the priority. Furthermore, the priorities set based on these various standards may be able to be switched.

Furthermore, in a case where the content is content that changes with time, the priorities may be set by considering not only the area of the overlapping range of the visual field image (range in the visual field image), but also the time of overlap of the visual field image.

Note that the avatar display process can also be applied to cases of displaying an icon of the user (icon corresponding to the user), a live-action image of the user, a character (string) (image of character) representing the user, or other user images representing the user, instead of displaying the avatar.

Furthermore, the icon may be displayed at first, and the display may be changed to display only the contour of the avatar, monochrome display of the avatar, full color display of the avatar, or the like according to the closeness of the relationship between the users or the degree of the communication.

In addition, mutual authentication may also be performed between the users before the icon or the avatar is displayed.

Note that for the content of either one of the free viewpoint image and the spherical image, various methods can also be used to control whether or not to display (superimpose) the user images, such as avatars, of the other users on the visual field image of the user.

For example, the avatar of another user with the visual field close to the user, that is, another user with a similar visual field image, can be displayed in the visual field image of the user, at a position close to the user in the visual field image of the user.

In addition, the avatar of another user who might get along with the user may be preferentially displayed on the visual field image of the user according to the proximity of seek positions of the same content viewed by the user and the other user (temporal positions of reproduced content), the proximity of the points of view of the user and the other user in the case where the content is a free viewpoint image of a 3D game or the like, a history of past conversation between the user and the other user, the proximity of relationship in an SNS, or the like.

Furthermore, for the avatar of each user, user information regarding the user such as, for example, the content of conversation (text chat) of the user and the nickname of the user, can be displayed along with the avatar. In the case where the avatar of another user can be displayed on the visual field image of the user, the display regarding the avatar of the other user to be displayed in the visual field image of the user can be limited according to the relationship between the user and the other user or the like.

For example, in a case where the avatar (position of the avatar) of another user is in the visual field of the user, but the avatar of the user is not in the visual field of the other user, the details of the display regarding the avatar of the other user, that is, for example, the angle of the neck and the expression of the avatar of the other user, the text of the conversation, and the like, may not be displayed in the visual field image of the user, and a simple avatar, that is, for example, only a silhouette (external form) of the avatar, may be displayed. Furthermore, a dialog for asking permission of communication may be displayed in the visual field image of each of the user and the other user, and in a case where each of the user and the other user permits the communication, the display regarding the avatar of the partner may be displayed in the visual field image. This case can prevent the user from peeping the communication of the other user. Note that in addition, only the icon of the partner may be displayed before each of the user and the other user permits the communication, and in the case where each of the user and the other user permits the communication, the avatar of the partner or a silhouette of live action may be displayed.

Furthermore, in the case of displaying the avatar of the other user in the visual field image of the user, a 3D image or the like may be adopted as the avatar of the other user. The visual field image may be displayed such that the visual field image comes around the avatar of the other user according to a motion of the neck or the body of the user, and this allows the user to feel that the existence of the other user is real.

Furthermore, when another user turns the neck to move away in the visual field image of the user in the case where the avatar of the other user with the visual field close to the user, that is, the other user with a similar visual field image, is displayed in the visual field image of the user, the avatar of the other user may be moved to a position far from the user in the visual field image of the user, or the avatar of another user (user different from the other user) with the visual field close to the user may be displayed in the visual field image of the user in place of the avatar of the other user.

In addition, the display regarding the avatar of another user to be displayed in the visual field image of the user can be changed according to the relationship between the user and the other user. For example, part of information (less information) of the display regarding the avatar of another user may be displayed in the visual field image of the user who has once talked to the other user and registered the other user as a friend. All of display (more information) regarding the avatar of another user may be displayed in the visual field image of the user who is talking to the other user.

Furthermore, in a case where the user can perform a zoom-in or zoom-out operation to adjust the angle of view of the image (range of the scene in the image) displayed on the display apparatus 22, whether the angle of view of the image displayed on the display apparatus 22 of the user and the angle of view of the image displayed on the display apparatus 22 of the other user are similar may also be taken into account to set the priority of displaying the avatar of the other user in the visual field image of the user.

Furthermore, in a case where the content includes a plurality of spherical images photographed by a plurality of spherical cameras, whether the user and the other user are viewing the spherical image photographed by the same spherical camera or the user and the other user are viewing the spherical images photographed by different spherical cameras may also be taken into account to set the priority of displaying the avatar of the other user in the visual field image of the user.

Furthermore, in the case where the content is a free viewpoint image, the proximity of the visual fields of the user and the other user may be determined according to, for example, the angles of the necks of the user and the other user, whether the same substance (object) is in the visual field images of the user and the other user, and the like. Whether the same substance is in the visual field images of the user and the other user may be determined by, for example, a combination of the positions (points of view) of the user and the other user and the angles of view of the visual field images of the user and the other user.

Furthermore, regarding the display of the avatar, a mode of displaying the avatar of another specific user and a mode of preferentially displaying the avatar of another user who has talked to the user in the past may be provided in the visual field image of the user, and the mode of displaying the avatar may be switched to the mode according to the operation of the user.

In this way, the avatars can be displayed to allow a large number of unspecified users viewing the same or similar scene in the same content to connect to each other, and the conversation can be smoothly advanced. Furthermore, the priorities can be set for the avatars (other users) according to the proximity of visual fields, the permission of communication, and the like, and the avatars can be displayed according to the priorities. This can prevent a large number of avatars from covering the entire visual field image which disturbs viewing the content.

<9. A Series of Processes Executed by Software>

The series of processes can be executed by hardware or can be executed by software. In the case where the series of processes are executed by software, a program included in the software is installed on a computer. Here, examples of the computer include a computer incorporated into dedicated hardware and a general-purpose personal computer or the like that can execute various functions by installing various programs.

FIG. 26 is a block diagram illustrating a configuration example of hardware of a computer that uses a program to execute the series of processes.

In a computer 500, a CPU (Central Processing Unit) 501, a ROM (Read Only Memory) 502, and a RAM (Random Access Memory) 503 are connected to each other through a bus 504.

An input/output interface 505 is further connected to the bus 504. An input unit 506, an output unit 507, a storage unit 508, a communication unit 509, and a drive 510 are connected to the input/output interface 505.

The input unit 506 includes a keyboard, a mouse, a microphone, and the like. The output unit 507 includes a display, a speaker, and the like. The storage unit 508 includes a hard disk, a non-volatile memory, and the like. The communication unit 509 includes a network interface and the like. The drive 510 drives a removable medium 511, such as a magnetic disk, an optical disk, a magneto-optical disk, and a semiconductor memory.

In the computer configured in this way, the CPU 501 loads a program stored in the storage unit 208 on the RAM 203 through the input/output interface 205 and the bus 204 and executes the program to execute the series of processes, for example.

The program executed by the computer (CPU 501) can be provided by, for example, recording the program in the removable medium 511 as a package medium or the like. In addition, the program can be provided through a wired or wireless transmission medium, such as a local area network, the Internet, and digital satellite broadcasting.

In the computer 500, the removable medium 511 can be mounted on the drive 510 to install the program on the storage unit 508 through the input/output interface 505. In addition, the communication unit 509 can receive the program through a wired or wireless transmission medium to install the program on the storage unit 508. Furthermore, the program can be installed in advance on the ROM 502 or the storage unit 508.

Note that the program executed by the computer 500 may be a program in which the processes are executed in chronological order described in the present specification, or the program may be a program for executing the processes in parallel or for executing the processes at necessary timing such as when the processes are invoked.

Note that the advantageous effects described in the present specification are illustrative only, and the advantageous effects are not limited. There may also be other advantageous effects.

The embodiment of the present technique is not limited to the embodiment described above, and various changes can be made without departing from the scope of the present technique.

<1>

An information processing apparatus including:

a content acquisition unit configured to acquire data of content;

an image cutting unit configured to cut out a first visual field image corresponding to a visual field of a first user from a content image based on the data of the content;

a visual field information acquisition unit configured to acquire visual field information representing a visual field of a second user viewing the content image; and a display control unit configured to control a display apparatus to display the first visual field image and configured to control the display apparatus to display the visual field of the second user based on the visual field information of the second user.

<2>

The information processing apparatus according to <1>, in which the display control unit is configured to control the display apparatus to display a visual field position instruction image indicating a position of the visual field of the second user based on the visual field information of the second user.

<3>

The information processing apparatus according to <2>, in which the visual field position instruction image includes a wide area image including the first visual field image and a second visual field image corresponding to the visual field of the second user.

<4>

The information processing apparatus according to <3>, in which the display control unit is configured to control the display apparatus to switch the first visual field image and the wide area image in response to a predetermined trigger.

<5>

The information processing apparatus according to <4>, in which the predetermined trigger includes at least one of a key operation, a voice command, a motion of a head, or a gesture operation by the first user.

<6>

The information processing apparatus according to any one of <3> to <5>, in which the wide area image includes at least one of an equirectangular projection, a Mercator projection, a bird's eye view, an aerial view, or a two-dimensional map.

<7>

The information processing apparatus according to any one of <2> to <6>, in which the visual field position instruction image includes a symbol image superimposed on the first visual field image, the symbol image indicating the position of the visual field of the second user.

<8>

The information processing apparatus according to any one of <1> to <7>, further including:

a visual field image determination unit configured to determine the first visual field image to be cut out from the content image based on at least one of a movement of a line of sight of the first user or a movement of a head of the first user.

<9>

The information processing apparatus according to <8>, in which the visual field image determination unit is configured to move the first visual field image based on the line of sight of the first user in response to approach of the line of sight of the first user to an edge of the first visual field image.

<10>

The information processing apparatus according to <8> or <9>, in which the visual field image determination unit is configured to make an angle of rotation of the first visual field image larger than an angle of rotation of the head of the first user based on an angle of rotation of the line of sight of the first user and the angle of rotation of the head of the first user.

<11>

The information processing apparatus according to any one of <8> to <10>, in which the visual field image determination unit is configured to determine, based on the visual field information of the second user, an initial position of the visual field image of the first user corresponding to timing that the first user has substantially started to view the content.

<12>

The information processing apparatus according to any one of <8> to <11>, in which the display apparatus includes a head mounted display, and the visual field image determination unit is configured to determine the first visual field image based on at least one of a movement of the line of sight of the first user or a movement of the head of the first user associated with the head mounted display.

<13>

The information processing apparatus according to any one of <1> to <12>, in which the second user includes a plurality of users, the display control unit is configured to control the display apparatus to superimpose, on the first visual field image, at least one of a plurality of user images corresponding to the plurality of users, and the display control unit is configured to control whether or not to superimpose, on the first visual field image, each of the plurality of user images according to a positional relationship between the first visual field image and a visual field of each of the plurality of users.

<14>

The information processing apparatus according to <13>, in which the display control unit is configured to control the display apparatus to preferentially superimpose, on the first visual field image, a user image corresponding to a user with the visual field relatively close to the first visual field image among the plurality of users.

<15>

The information processing apparatus according to <13> or <14>, in which the display control unit is configured to control the display apparatus to preferentially superimpose, on the first visual field image, part of the plurality of user images according to a history of communication between the first user and the plurality of users.

<16>

The information processing apparatus according to any one of <1> to <15>, in which the content image includes a spherical image or a free viewpoint image.

<17>

The information processing apparatus according to any one of <1> to <16>, further including:

the display apparatus.

<18>

An information processing method including:

acquiring data of content;

cutting out a first visual field image corresponding to a visual field of a first user from a content image based on the data of the content;

acquiring visual field information representing a visual field of a second user viewing the content image; and controlling a display apparatus to display the first visual field image and controlling the display apparatus to display the visual field of the second user based on the visual field information of the second user.

<19>

A program for causing a computer to function as:

a content acquisition unit configured to acquire data of content;

an image cutting unit configured to cut out a first visual field image corresponding to a visual field of a first user from a content image based on the data of the content;

a visual field information acquisition unit configured to acquire visual field information representing a visual field of a second user viewing the content image; and a display control unit configured to control a display apparatus to display the first visual field image and configured to control the display apparatus to display the visual field of the second user based on the visual field information of the second user.

REFERENCE SIGNS LIST

10 Content viewing system, 20 User apparatus, 21 Information processing apparatus, 22 Display apparatus, 31 Internet, 40 Server apparatus, 41 Content distribution unit, 42 Visual field information management unit, 43 Communication management unit, 51 Communication unit, 52 Content holding unit, 53 Visual field image determination unit, 54 Image cutting unit, 55 Visual field information holding unit, 58 Input unit, 59 Trigger detection unit, 60 Display control unit, 71 Line-of-sight detection unit, 72 Head motion detection unit, 73 Display unit, 74 Voice input/output unit, 100 Entire image, 101 Visual field range, 111 Visual field image, 112 Wide area image, 113 Visual field range display, 121 Visual field direction instruction mark, 131 Visual field direction instruction line, 132 Icon, 141 Visual field range display, 151 Tracking image, 162 Icon, 163 Arrow, 200 Content image, 301 Content space, 311 Avatar, 500 Computer, 501 CPU

The invention claimed is:

1. An information processing apparatus, comprising:
    circuitry configured to:
        acquire data of content;
        acquire, based on the data of the content, first visual field information that represents a visual field of a first user who views a content image;
        acquire, based on the data of the content, second visual field information that represents a visual field of a second user who views the content image; and
        control a display apparatus to:
            display a first visual field image to the first user based on the first visual field information;
            display the visual field of the second user to the first user based on the second visual field information; and
            display at least a wide area image to the first user based on a detection of a specific trigger, wherein the wide area image is generated from one of all or a part of the data of the content.

2. The information processing apparatus according to claim 1, wherein the visual field of the second user includes a visual field position instruction image that indicates a position of the visual field of the second user.

3. The information processing apparatus according to claim 2, wherein
    the visual field position instruction image includes the wide area image, and
    the wide area image includes the first visual field image and a second visual field image corresponding to the visual field of the second user.

4. The information processing apparatus according to claim 2, wherein
    the visual field position instruction image includes a symbol image superimposed on the first visual field image, and
    the symbol image indicates the position of the visual field of the second user.

5. The information processing apparatus according to claim 1, wherein the circuitry is further configured to control the display apparatus to concurrently display the first visual field image and the wide area image to the first user.

6. The information processing apparatus according to claim 1, wherein the specific trigger includes at least one of a key operation, a voice command, a motion of a head, or a gesture operation by the first user.

7. The information processing apparatus according to claim 1, wherein the wide area image includes at least one of an equirectangular projection, a Mercator projection, a bird's eye view, an aerial view, or a two-dimensional map.

8. The information processing apparatus according to claim 1, wherein
    the circuitry is further configured to determine the first visual field image to be cut out from the content image, and
    the first visual field image is cut out from the content image based on at least one of a movement of a line of sight of the first user or a movement of a head of the first user.

9. The information processing apparatus according to claim 8, wherein a movement of the first visual field image is based on the line of sight of the first user and approach of the line of sight of the first user to an edge of the first visual field image.

10. The information processing apparatus according to claim 8, wherein an angle of rotation of the first visual field image is larger than an angle of rotation of the head of the first user based on an angle of rotation of the line of sight of the first user and the angle of rotation of the head of the first user.

11. The information processing apparatus according to claim 8, wherein
    the circuitry is further configured to determine an initial position of the first visual field image based on the second visual field information of the second user, and
    the initial position of the first visual field image corresponds to timing at which the first user has substantially started to view the content.

12. The information processing apparatus according to claim 8, wherein
    the display apparatus includes a head mounted display, and
    the circuitry is further configured to determine the first visual field image based on at least one of the movement of the line of sight of the first user or the movement of the head of the first user associated with the head mounted display.

13. The information processing apparatus according to claim 1, wherein
    the second user corresponds to a plurality of users, and
    the circuitry is further configured to:
        control the display apparatus to superimpose, on the first visual field image, at least one of a plurality of user images corresponding to the plurality of users; and
        control superimposition of each of the plurality of user images on the first visual field image based on a positional relationship between the first visual field image and a visual field of each of the plurality of users.

14. The information processing apparatus according to claim 13, wherein
    the circuitry is further configured to control the display apparatus to superimpose, on the first visual field image, a specific user image of the plurality of user images, and
    the visual field of the specific user image is relatively close to the first visual field image among the plurality of user images.

15. The information processing apparatus according to claim 13, wherein
    the circuitry is further configured to control the display apparatus to superimpose, on the first visual field image, part of the plurality of user images based on a history of communication between the first user and the plurality of users.

16. The information processing apparatus according to claim 1, wherein the content image includes one of a spherical image or a free viewpoint image.

17. The information processing apparatus according to claim 1, further comprising the display apparatus.

18. An information processing method, comprising:
    acquiring data of content;
    acquiring, based on the data of the content, first visual field information representing a visual field of a first user who views a content image;
    acquiring, based on the data of the content, second visual field information representing a visual field of a second user who views the content image; and
    controlling a display apparatus to:
        display a first visual field image to the first user based on the first visual field information;

display the visual field of the second user to the first user based on the second visual field information; and display at least a wide area image to the first user based on a detection of a specific trigger, wherein the wide area image is generated from one of all or a part of the data of the content.

19. A non-transitory computer-readable medium having stored thereon computer-executable instructions which, when executed by circuitry of an information processing apparatus, cause the circuitry to execute operations, the operations comprising:

acquiring data of content;

acquiring, based on the data of the content, first visual field information representing a visual field of a first user who views a content image;

acquiring, based on the data of the content, second visual field information representing a visual field of a second user who views the content image; and controlling a display apparatus to:
  display a first visual field image to the first user based on the first visual field information;
  display the visual field of the second user to the first user based on the second visual field information; and
  display at least a wide area image to the first user based on a detection of a specific trigger, wherein the wide area image is generated from one of all or a part of the data of the content.

* * * * *